(12) United States Patent
Byers et al.

(10) Patent No.: US 7,870,346 B2
(45) Date of Patent: Jan. 11, 2011

(54) SERVO CONTROLLER INTERFACE MODULE FOR EMBEDDED DISK CONTROLLERS

(75) Inventors: Larry L. Byers, Apple Valley, MN (US); David M. Purdham, Brooklyn Park, MN (US); Michael R. Spaur, Dana Point, CA (US)

(73) Assignee: Marvell International Ltd., Hamilton (BM)

( * ) Notice: Subject to any disclaimer, the term of this patent is extended or adjusted under 35 U.S.C. 154(b) by 1328 days.

(21) Appl. No.: 10/796,727

(22) Filed: Mar. 9, 2004

(65) Prior Publication Data

US 2004/0193743 A1 Sep. 30, 2004

Related U.S. Application Data

(60) Provisional application No. 60/453,241, filed on Mar. 10, 2003.

(51) Int. Cl.
G06F 12/00 (2006.01)
G06F 13/18 (2006.01)

(52) U.S. Cl. .................. 711/150; 711/112; 711/152; 710/244

(58) Field of Classification Search ................. 711/112, 711/150, 152
See application file for complete search history.

(56) References Cited

U.S. PATENT DOCUMENTS

| | | | |
|---|---|---|---|
| 3,800,281 A | 3/1974 | Devore et al. |
| 3,988,716 A | 10/1976 | Fletcher et al. |
| 4,001,883 A | 1/1977 | Strout et al. |
| 4,016,368 A | 4/1977 | Apple, Jr. |
| 4,050,097 A | 9/1977 | Miu et al. |
| 4,080,649 A | 3/1978 | Calle et al. |
| 4,144,583 A | 3/1979 | Lawson et al. |
| 4,156,867 A | 5/1979 | Bench et al. |
| 4,225,960 A | 9/1980 | Masters |
| 4,275,457 A | 6/1981 | Leighou et al. |
| 4,390,969 A | 6/1983 | Hayes |

(Continued)

FOREIGN PATENT DOCUMENTS

EP 0528273 2/1993

(Continued)

OTHER PUBLICATIONS

"Clock Speed," http://web.archive.org/web/20030210202145/http://www.webopedia.com/TERM/C/clock_speed.html, Feb. 2003.*

(Continued)

*Primary Examiner*—Shane M Thomas

(57) ABSTRACT

An embedded disk controller ("controller") having a servo controller is provided. The controller also includes a servo controller interface with a speed matching module and a pipeline control module such that at least two processors share memory mapped registers without conflicts. The processors operate at different frequencies, while the servo-controller and the servo controller interface operate in same or different frequency domains. The pipeline control module resolves conflict between the first and second processor transaction. The speed matching module ensures communication without inserting wait states in a servo controller interface clock domain for write access to the servo controller and there is no read conflicts between the first and second processor. The controller also includes a hardware mechanism for indivisible register acess to the first or second processor. The hardware mechanisim includes a hard semaphore and/or soft semaphore.

16 Claims, 44 Drawing Sheets

U.S. PATENT DOCUMENTS

| | | |
|---|---|---|
| 4,451,898 A | 5/1984 | Palermo et al. |
| 4,486,750 A | 12/1984 | Aoki |
| 4,486,827 A | 12/1984 | Shima et al. |
| 4,500,926 A | 2/1985 | Yoshimaru et al. |
| 4,587,609 A | 5/1986 | Boudreau et al. |
| 4,603,382 A | 7/1986 | Cole |
| 4,625,321 A | 11/1986 | Pechar et al. |
| 4,667,286 A | 5/1987 | Young et al. |
| 4,777,635 A | 10/1988 | Glover |
| 4,805,046 A | 2/1989 | Kuroki et al. |
| 4,807,116 A | 2/1989 | Katzman et al. |
| 4,807,253 A | 2/1989 | Hagenauer et al. |
| 4,809,091 A | 2/1989 | Miyazawa et al. |
| 4,811,282 A | 3/1989 | Masina |
| 4,812,769 A | 3/1989 | Agoston |
| 4,860,333 A | 8/1989 | Bitzinger et al. |
| 4,866,606 A | 9/1989 | Kopetz |
| 4,881,232 A | 11/1989 | Sako et al. |
| 4,920,535 A | 4/1990 | Watanabe et al. |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley et al. |
| 5,088,093 A | 2/1992 | Storch et al. |
| 5,109,500 A | 4/1992 | Iseki et al. |
| 5,117,442 A | 5/1992 | Hall |
| 5,127,098 A | 6/1992 | Rosenthal et al. |
| 5,133,062 A | 7/1992 | Joshi et al. |
| 5,136,592 A | 8/1992 | Weng |
| 5,146,585 A | 9/1992 | Smith, III |
| 5,157,669 A | 10/1992 | Yu et al. |
| 5,162,954 A | 11/1992 | Miller et al. |
| 5,179,704 A | 1/1993 | Jibbe et al. |
| 5,193,197 A | 3/1993 | Thacker |
| 5,204,859 A | 4/1993 | Paesler et al. |
| 5,218,564 A | 6/1993 | Haines et al. |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson |
| 5,257,143 A | 10/1993 | Zangenehpour |
| 5,261,081 A | 11/1993 | White et al. |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama et al. |
| 5,280,488 A | 1/1994 | Glover et al. |
| 5,285,327 A | 2/1994 | Hetzler |
| 5,285,451 A | 2/1994 | Henson et al. |
| 5,301,333 A | 4/1994 | Lee |
| 5,307,216 A | 4/1994 | Cook et al. |
| 5,315,456 A | 5/1994 | Hessing et al. |
| 5,315,708 A | 5/1994 | Eidler et al. |
| 5,317,713 A | 5/1994 | Glassburn |
| 5,329,630 A | 7/1994 | Baldwin |
| 5,339,443 A | 8/1994 | Lockwood |
| 5,349,667 A | 9/1994 | Kaneko |
| 5,361,266 A | 11/1994 | Kodama et al. |
| 5,361,267 A | 11/1994 | Godiwala et al. |
| 5,375,248 A | 12/1994 | Lemay et al. |
| 5,408,644 A | 4/1995 | Schneider et al. |
| 5,408,673 A | 4/1995 | Childers et al. |
| 5,420,984 A | 5/1995 | Good et al. |
| 5,428,627 A | 6/1995 | Gupta |
| 5,440,751 A | 8/1995 | Santeler et al. |
| 5,465,343 A | 11/1995 | Henson et al. |
| 5,487,170 A | 1/1996 | Bass et al. |
| 5,488,688 A | 1/1996 | Gonzales et al. |
| 5,491,701 A | 2/1996 | Zook |
| 5,500,848 A | 3/1996 | Best et al. |
| 5,506,989 A | 4/1996 | Boldt et al. |
| 5,507,005 A | 4/1996 | Kojima et al. |
| 5,519,837 A | 5/1996 | Tran |
| 5,523,903 A | 6/1996 | Hetzler et al. |
| 5,544,180 A | 8/1996 | Gupta |
| 5,544,346 A | 8/1996 | Amini |
| 5,546,545 A | 8/1996 | Rich |
| 5,546,548 A | 8/1996 | Chen et al. |
| 5,557,764 A | 9/1996 | Stewart et al. |
| 5,563,896 A | 10/1996 | Nakaguchi |
| 5,568,606 A | 10/1996 | Dobbek |
| 5,572,148 A | 11/1996 | Lytle et al. |
| 5,574,867 A | 11/1996 | Khaira |
| 5,581,715 A | 12/1996 | Verinsky et al. |
| 5,583,999 A | 12/1996 | Sato et al. |
| 5,590,380 A | 12/1996 | Yamada et al. |
| 5,592,404 A | 1/1997 | Zook |
| 5,600,662 A | 2/1997 | Zook et al. |
| 5,602,857 A | 2/1997 | Zook et al. |
| 5,603,035 A | 2/1997 | Erramoun et al. |
| 5,615,190 A | 3/1997 | Best et al. |
| 5,623,672 A | 4/1997 | Popat |
| 5,627,695 A | 5/1997 | Prins et al. |
| 5,629,949 A | 5/1997 | Zook |
| 5,640,602 A | 6/1997 | Takase |
| 5,649,230 A | 7/1997 | Lentz |
| 5,659,759 A | 8/1997 | Yamada |
| 5,664,121 A | 9/1997 | Cerauskis |
| 5,689,656 A | 11/1997 | Baden et al. |
| 5,691,994 A | 11/1997 | Acosta et al. |
| 5,692,135 A | 11/1997 | Alvarez, II et al. |
| 5,692,165 A | 11/1997 | Jeddeloh et al. |
| 5,692,516 A | 12/1997 | Kaneko et al. |
| 5,719,516 A | 2/1998 | Sharpe-Geisler |
| 5,729,511 A | 3/1998 | Schell et al. |
| 5,729,718 A | 3/1998 | Au |
| 5,734,848 A | 3/1998 | Gates et al. |
| 5,740,466 A | 4/1998 | Geldman |
| 5,745,793 A | 4/1998 | Atsatt et al. |
| 5,754,759 A | 5/1998 | Clarke et al. |
| 5,758,188 A | 5/1998 | Appelbaum et al. |
| 5,768,044 A | 6/1998 | Hetzler et al. |
| 5,784,569 A | 7/1998 | Miller et al. |
| 5,787,483 A | 7/1998 | Jam et al. |
| 5,794,073 A | 8/1998 | Ramakrishnan et al. |
| 5,801,998 A | 9/1998 | Choi |
| 5,805,370 A | 9/1998 | Lee |
| 5,818,886 A | 10/1998 | Castle |
| 5,822,142 A | 10/1998 | Hicken |
| 5,826,093 A | 10/1998 | Assouad et al. |
| 5,831,922 A | 11/1998 | Choi |
| 5,835,299 A | 11/1998 | Lee et al. |
| 5,835,930 A | 11/1998 | Dobbek |
| 5,841,722 A | 11/1998 | Willenz |
| 5,844,844 A | 12/1998 | Bauer et al. |
| 5,850,422 A | 12/1998 | Chen |
| 5,854,918 A | 12/1998 | Baxter |
| 5,890,207 A | 3/1999 | Sne et al. |
| 5,890,210 A | 3/1999 | Ishii et al. |
| 5,907,717 A | 5/1999 | Ellis |
| 5,912,906 A | 6/1999 | Wu et al. |
| 5,925,135 A | 7/1999 | Trieu et al. |
| 5,928,367 A | 7/1999 | Nelson et al. |
| 5,937,435 A | 8/1999 | Dobbek et al. |

| | | |
|---|---|---|
| 5,950,223 A | 9/1999 | Chiang et al. |
| 5,968,180 A | 10/1999 | Baco |
| 5,983,293 A | 11/1999 | Murakami |
| 5,991,911 A | 11/1999 | Zook |
| 6,021,458 A | 2/2000 | Jayakumar et al. |
| 6,029,226 A | 2/2000 | Ellis et al. |
| 6,029,250 A | 2/2000 | Keeth |
| 6,041,417 A | 3/2000 | Hammond et al. |
| 6,065,053 A | 5/2000 | Nouri et al. |
| 6,067,206 A | 5/2000 | Hull et al. |
| 6,070,200 A | 5/2000 | Gates et al. |
| 6,078,447 A | 6/2000 | Sim |
| 6,081,397 A | 6/2000 | Belser |
| 6,081,849 A | 6/2000 | Born et al. |
| 6,081,867 A | 6/2000 | Cox |
| 6,092,231 A | 7/2000 | Sze |
| 6,094,320 A | 7/2000 | Ahn |
| 6,105,119 A | 8/2000 | Kerr et al. |
| 6,108,150 A | 8/2000 | Lee |
| 6,115,778 A | 9/2000 | Miyake et al. |
| 6,124,994 A | 9/2000 | Malone, Sr. |
| 6,128,153 A | 10/2000 | Hasegawa et al. |
| 6,134,063 A | 10/2000 | Weston-Lewis et al. |
| 6,134,676 A | 10/2000 | VanHuben et al. |
| 6,157,984 A | 12/2000 | Fisher |
| 6,178,486 B1 | 1/2001 | Gill et al. |
| 6,192,499 B1 | 2/2001 | Yang |
| 6,201,655 B1 | 3/2001 | Watanabe et al. |
| 6,223,303 B1 | 4/2001 | Billings et al. |
| 6,279,089 B1 | 8/2001 | Schibilla et al. |
| 6,285,632 B1 | 9/2001 | Ueki |
| 6,297,926 B1 | 10/2001 | Ahn |
| 6,314,480 B1 | 11/2001 | Nemazie et al. |
| 6,330,626 B1 | 12/2001 | Dennin et al. |
| 6,381,659 B2 | 4/2002 | Proch et al. |
| 6,401,149 B1 | 6/2002 | Dennin et al. |
| 6,401,154 B1 | 6/2002 | Chiu et al. |
| 6,421,760 B1 | 7/2002 | McDonald et al. |
| 6,467,006 B1 * | 10/2002 | Alexander et al. .......... 710/240 |
| 6,470,461 B1 | 10/2002 | Pinvidic et al. |
| 6,487,631 B2 | 11/2002 | Dickinson et al. |
| 6,490,635 B1 | 12/2002 | Holmes |
| 6,493,171 B2 | 12/2002 | Enokida et al. |
| 6,496,517 B1 | 12/2002 | Gehman et al. |
| 6,515,813 B2 | 2/2003 | Kitazaki et al. |
| 6,530,000 B1 | 3/2003 | Krantz et al. |
| 6,574,676 B1 | 6/2003 | Megiddo |
| 6,574,699 B1 | 6/2003 | Dobbek |
| 6,583,943 B2 | 6/2003 | Malone |
| 6,594,721 B1 | 7/2003 | Sakarda et al. |
| 6,618,780 B1 | 9/2003 | Popat |
| 6,629,204 B2 | 9/2003 | Tanaka et al. |
| 6,651,126 B1 | 11/2003 | Cantrell et al. |
| 6,662,253 B1 * | 12/2003 | Gary et al. ................. 710/244 |
| 6,662,313 B1 | 12/2003 | Swanson et al. |
| 6,662,334 B1 | 12/2003 | Stenfort |
| 6,693,462 B1 | 2/2004 | Wang et al. |
| 6,694,398 B1 | 2/2004 | Zhao et al. |
| 6,711,643 B2 | 3/2004 | Park et al. |
| 6,714,373 B1 | 3/2004 | Sasaki |
| 6,721,828 B2 | 4/2004 | Verinsky et al. |
| 6,725,293 B1 * | 4/2004 | Nakayama et al. ............ 710/36 |
| 6,728,054 B2 | 4/2004 | Chng et al. |
| 6,728,814 B2 | 4/2004 | Leinen |
| 6,742,060 B2 | 5/2004 | Poisner et al. |
| 6,742,065 B1 | 5/2004 | Suh |
| 6,745,274 B1 * | 6/2004 | Snyder et al. ............... 710/240 |
| 6,765,736 B2 | 7/2004 | Ko et al. |
| 6,765,744 B2 | 7/2004 | Gomez et al. |
| 6,772,258 B2 | 8/2004 | Poisner et al. |
| 6,807,595 B2 | 10/2004 | Khan et al. |
| 6,826,650 B1 | 11/2004 | Krantz et al. |
| 6,880,030 B2 | 4/2005 | Brenner et al. |
| 6,895,500 B1 | 5/2005 | Rothberg |
| 6,917,997 B2 | 7/2005 | Bhagat |
| 6,924,953 B2 | 8/2005 | Fish et al. |
| 6,944,703 B2 | 9/2005 | Okaue et al. |
| 6,947,233 B2 | 9/2005 | Toda |
| 6,950,258 B2 | 9/2005 | Takaishi |
| 6,952,749 B2 | 10/2005 | Kim |
| 6,963,462 B2 | 11/2005 | Satoh |
| 7,039,771 B1 | 5/2006 | Spaur et al. |
| 7,064,915 B1 | 6/2006 | Spaur et al. |
| 7,080,188 B2 | 7/2006 | Byers et al. |
| 7,099,963 B2 | 8/2006 | Byers et al. |
| 7,174,401 B2 | 2/2007 | Stuber et al. |
| 7,219,182 B2 | 5/2007 | Byers et al. |
| 2001/0043424 A1 | 11/2001 | Nguyen |
| 2001/0044873 A1 | 11/2001 | Wilson et al. |
| 2002/0065994 A1 * | 5/2002 | Henson et al. .............. 711/151 |
| 2002/0080698 A1 | 6/2002 | Turner et al. |
| 2002/0087773 A1 | 7/2002 | Poisner et al. |
| 2002/0087931 A1 | 7/2002 | Jaber |
| 2002/0120815 A1 | 8/2002 | Zahavi et al. |
| 2002/0124132 A1 | 9/2002 | Haines et al. |
| 2002/0149868 A1 | 10/2002 | Nakasato |
| 2002/0184453 A1 * | 12/2002 | Hughes et al. .............. 711/150 |
| 2002/0199076 A1 | 12/2002 | Fujii |
| 2003/0037225 A1 | 2/2003 | Deng et al. |
| 2003/0070030 A1 | 4/2003 | Smith et al. |
| 2003/0081479 A1 | 5/2003 | Matsumoto et al. |
| 2003/0084269 A1 | 5/2003 | Drysdale et al. |
| 2003/0107834 A1 * | 6/2003 | Fish et al. ..................... 360/69 |
| 2003/0117909 A1 | 6/2003 | Kawano |
| 2003/0204655 A1 | 10/2003 | Schmisseur et al. |
| 2004/0019831 A1 | 1/2004 | Gergen et al. |
| 2004/0093538 A1 | 5/2004 | Hester et al. |
| 2004/0199695 A1 | 10/2004 | Purdham et al. |
| 2004/0221133 A1 * | 11/2004 | Ward et al. ................. 711/211 |
| 2006/0129704 A1 | 6/2006 | Byers et al. |
| 2007/0226392 A1 | 9/2007 | Byers et al. |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1998 |
| WO | WO 2004081738 | 9/2004 |

OTHER PUBLICATIONS

PCT International Search Report, Doc. No. PCT/US00/15084, Dated Nov. 15, 2000, 2 Pages.

Blathut R. Digital Transmission of Information (Dec. 4, 1990), pp. 429-430.

Hwang, Kai and Briggs, Faye A., "Computer Architecture and Parallel Processing" pp. 156-164.

Zeidman, Bob, "Interleaving DRAMS for faster access", System Design ASIC & EDA, pp. 24-34 (Nov. 1993).

P.M. Bland et. al. Shared Storage Bus Circuitry, IBM Technical Disclosure Bulletin, vol. 25, No. 4, Sep. 1982, pp. 2223-2224.

PCT search report for PCT/US00/07780 mailed Aug. 2, 2000, 4 Pages.

PCT search report for PCT/US01/22404, mailed Jan. 29, 2003, 4 Pages.
PCT International Search Report, Doc. No. PCT/US2004/007119, Dated Aug. 25, 2005.
PCI Local Bus Specification, Revision 2.1, Jun. 1, 1995, pp. 9-12, 21-23, 33-42, 108-109, 235-243.
"Embedded Risc Microcontroller Core ARM7TDMI". Revision 0673CS-11/99. Atmel Corporation.
Information Technology—Small Computer System Interface—2 (SCSI-2). Revision 10L, Sep. 7, 1993, pp. 31-46, 91-93, 104-108, 118, 135, 161, and 223.
Sharp. "Memory and Peripheral Interface." LH77790A/B User's Guide Version 1 (1999): 5-1 to 5-35.
Tanenbaum, Andrew S. Structure Computer Organization. 3rd ed. London: Prentice-Hall, Jan. 1990. 11-13.

* cited by examiner

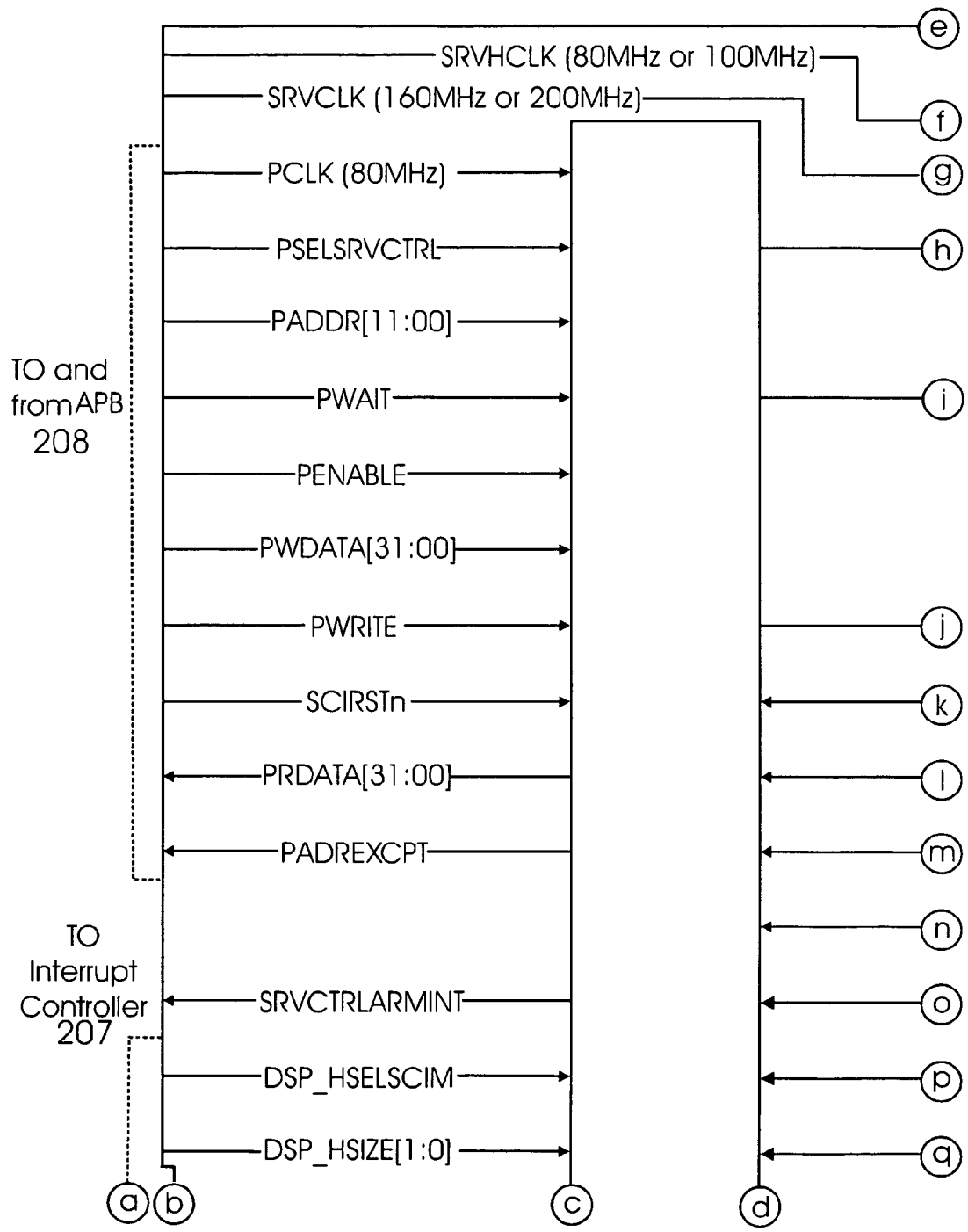
FIGURE 3-(i)

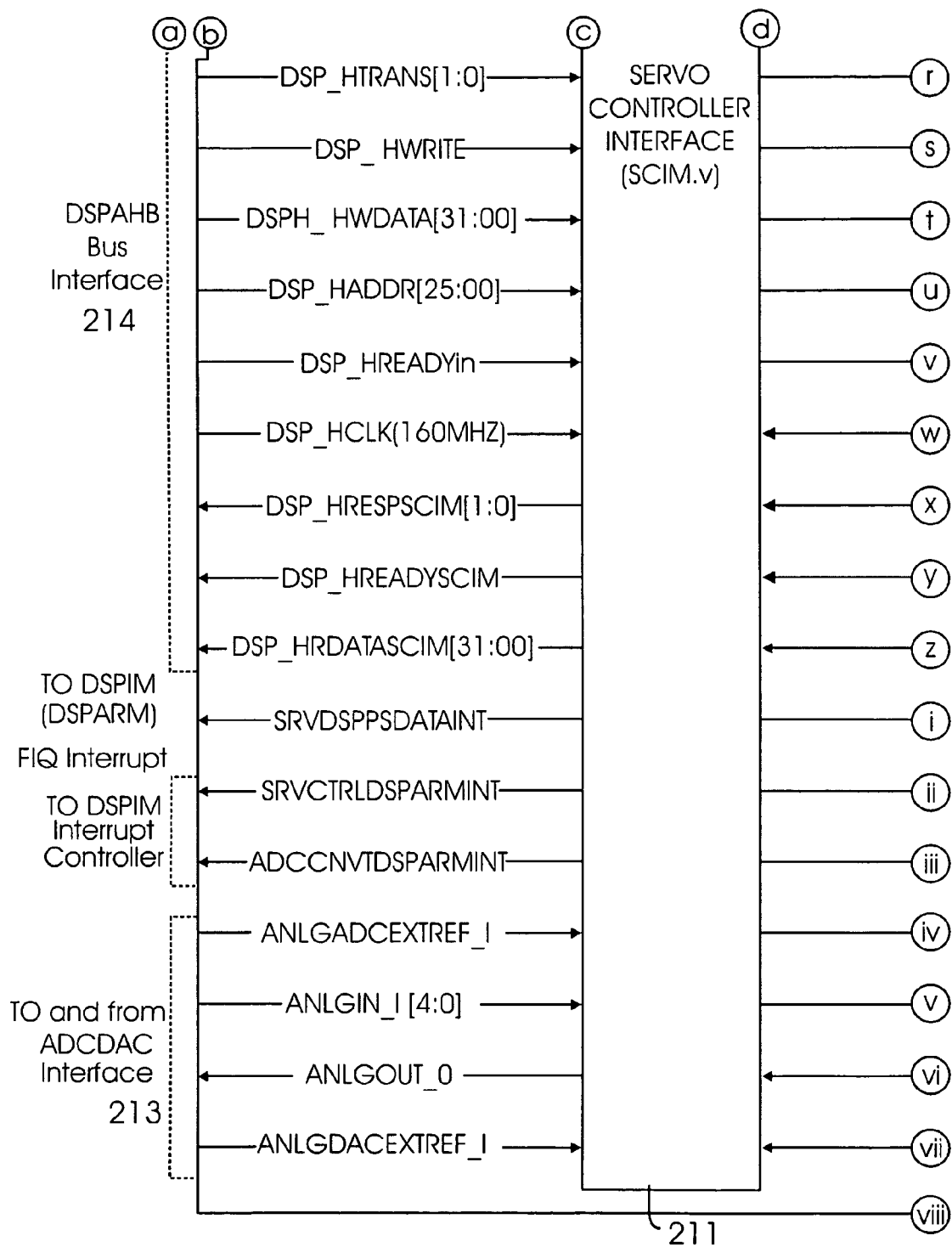
FIGURE 3-(ii)

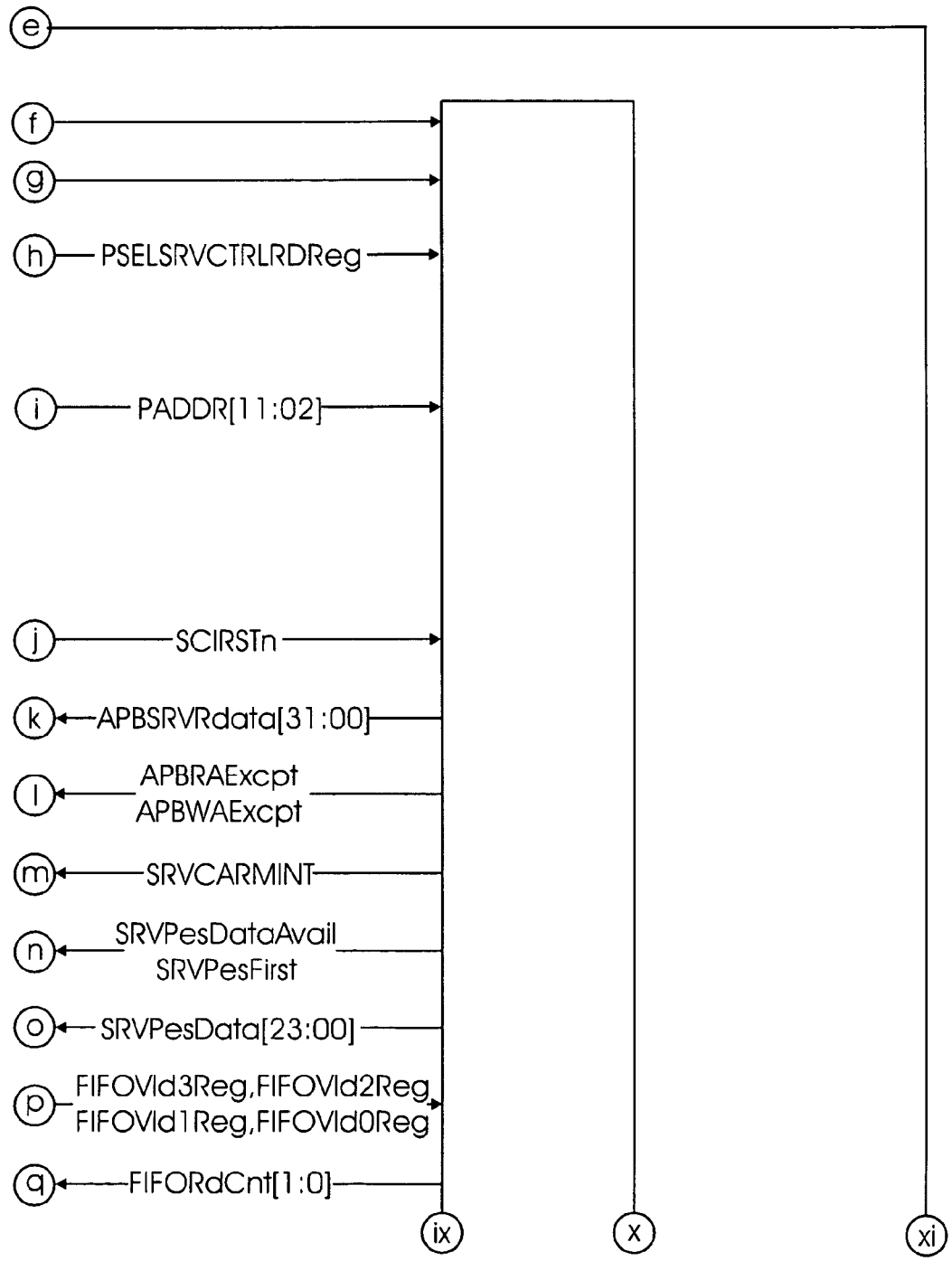
FIGURE 3-(iii)

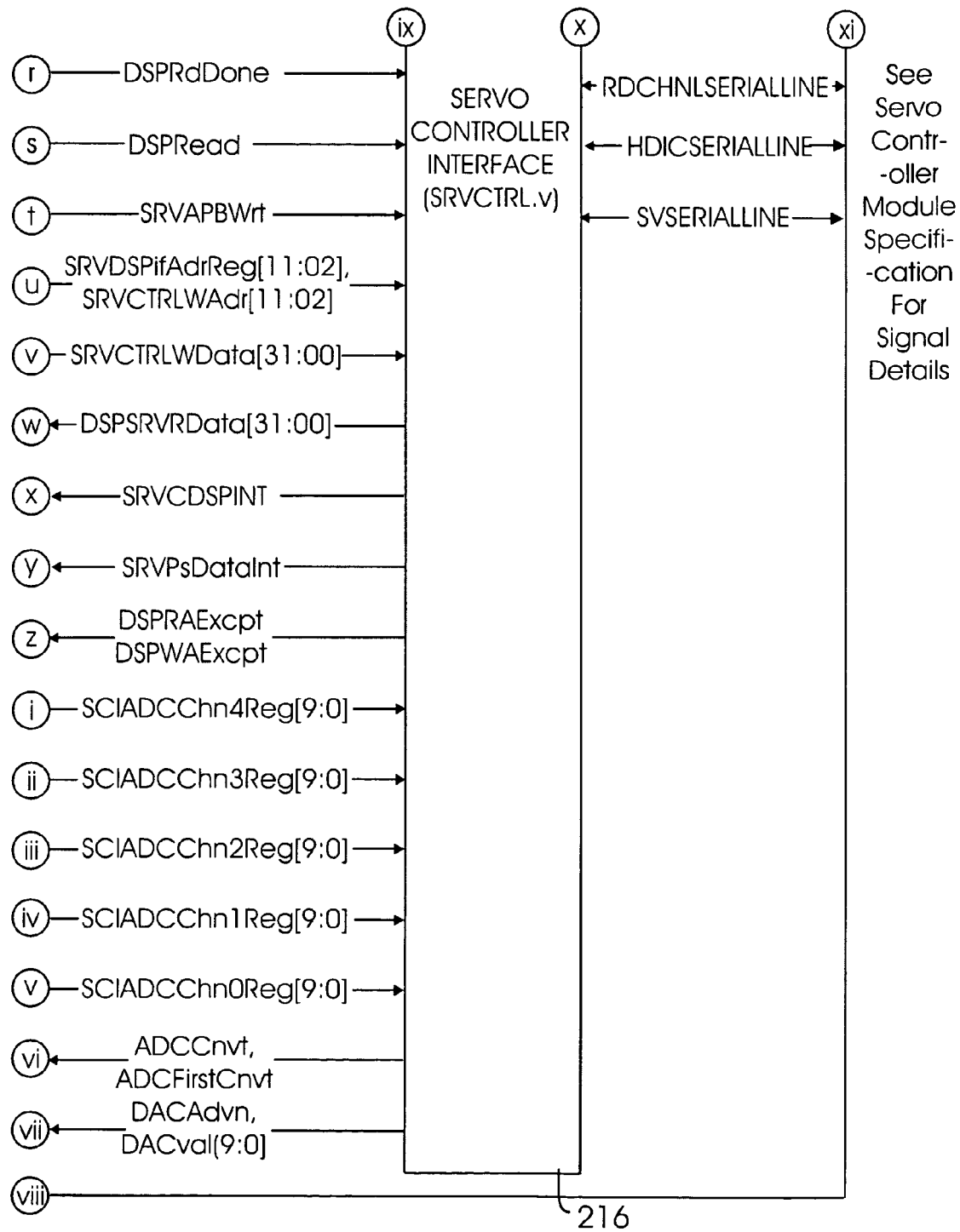
FIGURE 3-(iv)

| Signal | Count | Description |
|---|---|---|
| PCLK | 1 | APB 208 Clock signal controls register loads and register reads associated with APB 208 transactions. All action in SCI 211 associated with APB 208 occurs on the low to high assertion of the PCLK signal. |
| SCIRSTn | 1 | APB 208 Reset or firmware reset signal is asserted active low when APB 208 is reset or when the firmware sets the MdlRstReg[07]. When this signal is asserted all registers in SCI 211 and SC 216 are cleared to a default reset value and interrupts are disabled. |
| PENABLE | 1 | APB 208 Enable signal is asserted high active for 1 clock cycle by APB Bridge 235 to enable all register access associated with APB interface 214 in SCI 211. |
| PSELSRVCTRL | 1 | This signal when asserted high indicates that APB Bridge235 has selected SCI 211 for an APB 208 transaction. One signal is provided for each APB 208 peripheral. This signal is asserted by APB Bridge 235 at the start of the transaction and remains asserted until the transaction is completed. |
| PADDR[11:00] | 12 | This is an APB 208 Address (for example, 12 bits) that is decoded by SCI 211 to select a local register or register during an APB Bridge 235 access. If the address is for SC 216, then SCI 211 passes this address to SC 216. SCI 211 also validates the address. These signals are asserted by APB Bridge 235 at the start of the transaction and remains asserted until the transaction completes. |
| PWRITE | 1 | This is an APB208 Write signal that indicates a write transaction when asserted high and a read transaction when asserted low. This signal is asserted by APB Bridge 235 at the beginning of the transaction and remains asserted until the transaction is completed. |
| PWDATA[31:00] | 32 | These are APB 208 Write Data signals that are driven by APB Bridge 235 and when executing a write transaction provides the associated write data for these signals. |

FIGURE 4A

| Signal | Count | Description |
|---|---|---|
| PRDATA[31:00] | 32 | The APB 208 Read Data Signal:: When APB Bridge 235 selects SCI 211 and the PWRITE signal is asserted low, SCI 211 supplies the read data based on the decode of the PADDR[11:00]. When the read data is from SC 216, SC 211 synchronizes this signal to the 80MHz clock domain and drives bits 31:00 of APB 208 read data. |
| SRVCTRLARMINT | 1 | This is an Interrupt from SCI 211 to the Interrupt Controller 207 : SCI 211 synchronizes this signal to the 80MHz clock domain. |
| PWAIT | 1 | This APB 208 Bus Wait signal is asserted by SCI 211 to indicate to APB Bridge 235 that it cannot complete the requested read transaction in two bus cycles . To insert a wait state this signal is asserted before APB Bridge 235 asserts PENABLE . When the signal is de-asserted (synchronous with PCLK), APB Bridge 235 asserts PENABLE on the subsequent PCLK. |
| PADREXCPT | 1 | This indicates an APB 208 Address Exception. It is asserted high for one PCLK clock cycle when SCI 211 detects an APB 208 "address exception". |

FIGURE 4B

| Signal | Count | Description |
|---|---|---|
| DSP_HRDATASCIM[31:00] | 32 | The Servo Controller Interface Read Data signals are used to transfer read data from SCI 211 to the requesting bus master (DSP 232) through the Slave To Master Multiplexer (not shown) of the DSPAHB Bus 233. |
| DSP_HRESPSCIM[1:0] | 2 | This signal provides a Servo Controller Interface Response. When SCI 211 is selected to respond to a bus master (DSP 232) then SCI 211 indicating the status of the requested bus transaction it has completed controls the signals. These signals are returned to the bus master through the Slave To Master Multiplexer (not shown) of the DSPAHB Bus 233. |
| DSP_HREADYout | 1 | Servo Controller Interface HREADY out signal: When SCI 211 is selected to respond to a bus master(DSP 232) , SCI 211 asserts this signal indicating to the bus master that it has completed the requested bus transaction . This signal is returned to the bus master through the Slave To Master Multiplexer of the DSPAHB Bus 233. |

FIGURE 5B

| Signal | Count | Description |
|---|---|---|
| DSP_HCLK | 1 | This is the DSPAHB Bus 233 clock signal that controls register loads; status reads and synchronizes bus transactions to DSP 232(that acts a bus-master). All action with the DSPAHB Bus 233 in SCI 211 occurs on low to high assertion of this clock. |
| DSP_HSELSCIM | 1 | This signal is asserted by DSPAHB Bus 233 Address Decoder Module decoding the most significant 6 bits of the DSPAHB Address (DSP_HADDR[31:26]) which selects the assigned address space, for SCI 211 and SC 216. |
| DSP_HTRANS[1:0] | 2 | This DSPAHB Bus Transfer signal indicates the type of transfer a current DSPAHB Bus 233 transaction is executing ( NONSEQUENTIAL , SEQUENTIAL , IDLE or BUSY ). SCI 216 uses this information to determine the transfer type and the Response (AHBHRESP[1:0]) that will be returned to Bus 233. |
| DSP_HWRITE | 1 | This DSPAHB Write signal specifies whether the DSPAHB Bus 233 transaction is a read (DSP_HWRITE = 0) access or a write (DSP_HWRITE = 1) access. |
| DSP_HADDR[25:00] | 26 | This signal indicates the DSPAHB Address. The 26 bits of the DSPAHB Bus 233 address specify the memory mapped register 1209 or a memory location in SCI 211 or SC 216 bus master (DSP 232) is accessing. |
| DSP_HWDATA[31:00] | 32 | This DSPAHB Write Data [31:00] signal transfers the data from the DSPAHB Bus 233 master to SCI 211 during a write (store) transaction. SCI 211 registers these signals and either writes to a local register with this data and control information or transfers the data to SC 216. |
| DSP_HSIZE[1:0] | 2 | The DSPAHB Bus Size signal specifies the size of a transfer, i.e., byte, half word, or word. Byte = 00b: Halfword=01b:Word = 10b: Invalid = 11b. |
| DSP_HREADYin | 1 | The DSPAHB Bus Ready In signal indicates that a DSPAHB Bus 233 transaction has completed and a new transaction is starting. SCI 211 uses the assertion of this signal to enable loading the address and control information ( DSPAHB Address,DSPAHB Size, DSPAHB Transfer, DSPAHB Write and DSPHSELSRVCTRL). |

FIGURE 5A

| Signal | Count | Description |
|---|---|---|
| SRVCTRLDSPARMINT | 1 | Servo Controller DSP 232 Interrupt- This signal, if enabled, is asserted as a level sensitive interrupt to APBDSP Interface (DSPIRQ[0]) 214 indicating that an exception has occurred in SCI 211 or SC 216 due to an action by DSP 232. To determine the source of the exception, the SCIDSPARMStatusReg is interrogated. |
| SRVDSPPSDATAINT | 1 | Servo Controller DSP Positioning Data Available Interrupt signal if enabled, is asserted as an edge sensitive interrupt (one DSP_HCLK clock cycle pulse) to DSP 232 FIQ input indicating that SC 216 has error positioning information available for processing. |
| ADCCNVTDSPARMINT | 1 | ADC Conversion Complete Interrupt to DSP 232 signal, if enabled is asserted as an edge sensitive interrupt (one DSP_HCLK clock pulse) to the DSP Interrupt Controller in the DSP Interface Module 210 indicating that SCI 211 has ADC (analog to digital) conversion information available for processing. |

FIGURE 6

| Signal | Count | Description |
|---|---|---|
| PRESETn (directly from APB Bridge 235) | 1 | APB 208 Reset signal is asserted active low when APB 208 is reset. When this signal is asserted all registers in SCI 211 and SC 216 are cleared to a default reset value and interrupts are disabled. SC 216 synchronizes this signal to its clock domain. |
| PSELSRVCTRLRDReg | 1 | Servo Controller Read from APB 208- This signal is asserted by SCI 211 when an APB 208 read transaction is requested. This signal is synchronized by SC 216 to its clock domain and SC 216 based on PADDR[11:02], takes a "snapshot" of the contents of the accessed register or supplies the data of the accessed static register to SCI 211. If SC 216 takes a "snapshot" of the contents of a dynamic register then SC 216 supplies stable data to SCI 211. |
| PADDR[11:02] | 10 | APB Address. These 10 bits are APB 208 address. SCI 211 decodes these 10 bits to select a local register in SCI 211 or SC 216 register during an APB Bridge235 transaction. If the access is a read transaction SCI 211 passes these signals on to SC 216 to select the contents of the specified register. SC 216 using PSELSRVCTRLRD synchronizes these signals to SC 216 clock domain. These signals remain asserted until the read transaction has completed on APB 208. |

FIGURE 7

| Signal | Count | Description |
|---|---|---|
| FIFOVld0Reg<br>FIFOVld1Reg<br>FIFOVld2Reg<br>FIFOVld3Reg | 4 | Write FIFO Entry x [3:0] Valid Signals - When SCI 211 asserts one of these signals entry x is valid ready for SC 216 to write the addressed register. SCI 216 asserts this signal for 2 DSP_HCLK (160MHz) clock cycles. |
| SRVCTRLWAdr[9:0] | 10 | FIFO Entry Write Address specifies the memory mapped register that SCI 211 is writing in SC 216. SCI 211 validates this address before passing it on. |
| SRVCTRLWData[31:0] | 32 | FIFO Entry Write Data signals are associated with the write data address. SRVCTRLWAdr[9:0], that specifies the memory mapped register 1209 in SC 216 that SCI 211 is writing to. |
| SRVAPBWrt | 1 | Servo APB Write signal Specifies the interface which generated the write entry in the Speed Matching Write FIFO 1206. SC 216 use this information to route "write address exceptions" back to the initiating interface in SCI 211.SRVAPBWrt = 0 = Auxiliary Register Interface. SRVAPBWrt = 1 = APB write. |

FIGURE 8

| Signal | Count | Description |
|---|---|---|
| FIFORdCnt[1:0] | 2 | FIFO Read Count signal selects the FIFO (1206) entry that SC 216 is reading the address and writing data from. |

FIGURE 9

| Signal | Count | Description |
|---|---|---|
| DSPRead | 1 | DSP Read access request - When this signal is asserted (high) DSP 232 is requesting a read of a SC 216 memory mapped register (1209) specified by DSP_HADDR[11:02]. This signal remains asserted until the read transaction is completed. |
| DSPRdDone | 1 | DSP Read Done - SCI 211 asserts this signal for 1 DSP_HCLK clock cycle indicating that DSP 232 read will complete this cycle. |
| SRVDSPIfAdrReg[11:02] | 10 | DSPARM Interface Address Register- The contents of this register specifies the address of the memory-mapped register(1206) that DSP 232 is accessing in SC 216. SCI 211 validates this address before passing it on. |

FIGURE 10

| Signal | Count | Description |
|---|---|---|
| APBSRVRdata[31:00] | 32 | APB Servo Controller Read Data is the read data from SC 216 to SCI 211 based on the decode of the PADDR[11:02] signal. SCI 211 synchronizes this data to the PCLK domain and loads APBSRVRdReg[31:00] which drives PRDATA[31:00] to APB 208. |
| DSPSRVRdata[31:00] | 32 | DSPSARM Servo Controller Read Data is the read data from SC 216 to SCI 211 based on the decode of SRVDSPIfAdrReg[11:00] signal. SCI 211 synchronizes this read data to the DSP_HCLK domain and loads SRVRDataReg[31:00] which drives DSP_HRDATA[31:00] to DSP 232. |
| SRVCARMINT | 1 | Servo Controller ARM Interrupt signal is a level sensitive interrupt from SC 216 when routing an interrupt to processor 240. This signal is synchronized to the SCI clock domain (DSP_HCLK). |
| SRVCDSPINT | 1 | SC 216 when routing an interrupt to DSP 232 asserts this Interrupt signal. SCI 211 synchronizes this level sensitive signal to the DSP_HCLK domain. This interrupt is asserted for exceptions that are routed to DSP 232 with the exception of the positioning data interrupt (SRVPsDataInt) from the Read Channel. |
| SRVPsDataInt | 1 | SC 216 asserts this Servo Positioning Data Interrupt signal for two clock cycles when the Servo Mechanism position data is available from the Read Channel. SCI 211 synchronizes this signal to the DSP 232 clock domain(DSP_HCLK) while generating the interrupt. |

FIGURE 11-(i)

| | | |
|---|---|---|
| APBRAExcpt | 1 | This APB 208 Read Address Exception signal occurs when SC 216 detects an address exception on an APB 208 read transaction. SC 216 asserts this signal for two (SRVCLK) clock cycles. SCI 211 captures this signal and asserts the PADREXCPT signal to APB Bridge 235. |
| APBWAExcpt | 1 | This APB 208 Write Address Exception occurs when SC 216 detects an address exception on an APB 208 write transaction. SC 216 asserts this signal for two (SRVCLK) clock cycles. SCI 211 captures this signal and asserts the PADREXCPT signal to APB Bridge 235. |
| DSPRAExcpt | 1 | The DSP 232 Read Address Exception occurs when SC 216 detects an address exception for a DSP 232 read transaction.SC 216 asserts this signal for two(SRVCLK) clock cycles. SCI 211 captures this signal and generates an interrupt to DSP 232. |
| DSPWAExcpt | 1 | DSPARM Write Address Exception - SC 216 detects an address exception on a DSP 232 write transaction. SC 216 asserts this signal for two (SRVCLK) clock cycles.SCI 211 captures this signal and generates an interrupt to DSP 232. |

FIGURE 11-(ii)

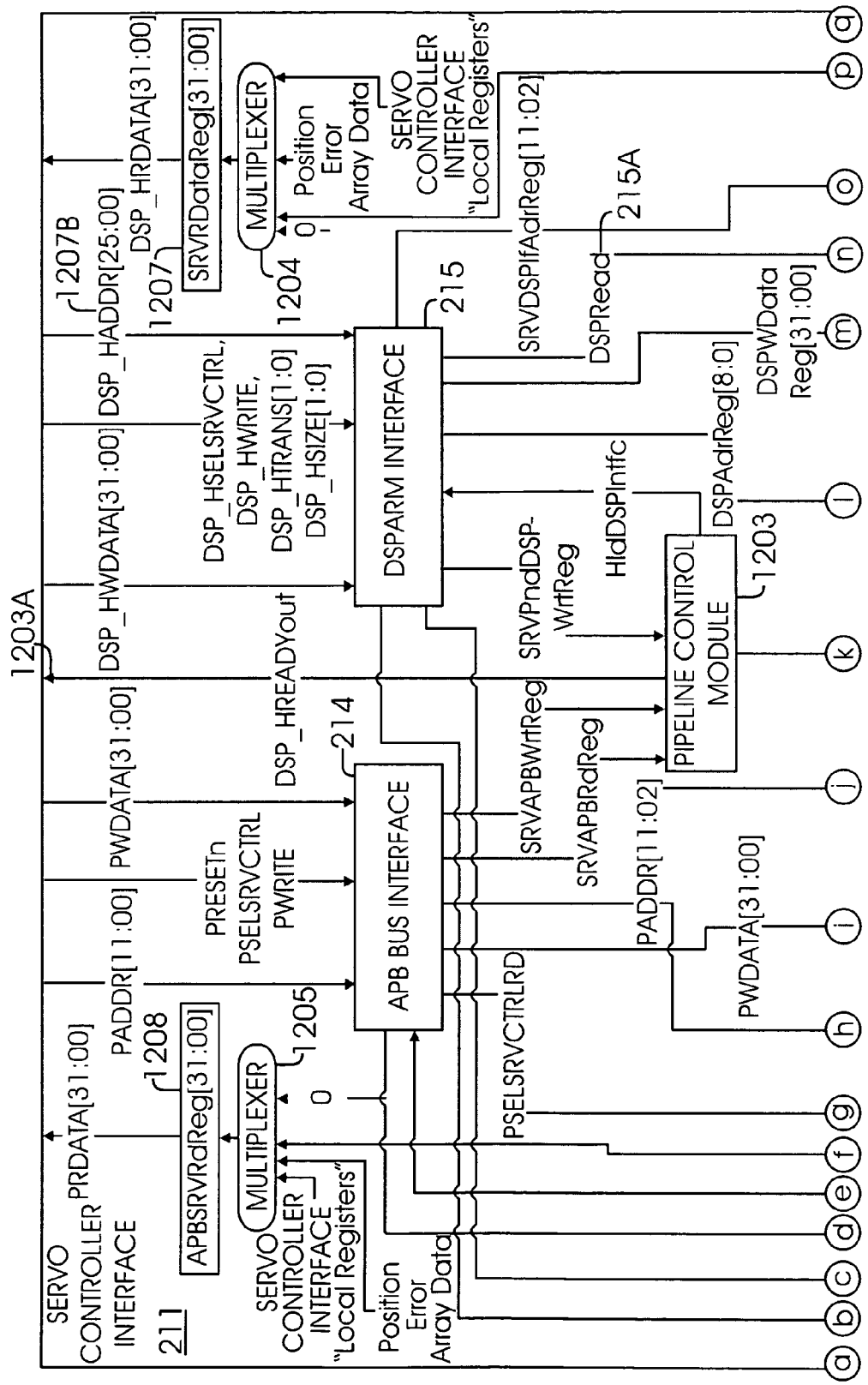
FIGURE 12A-(i)

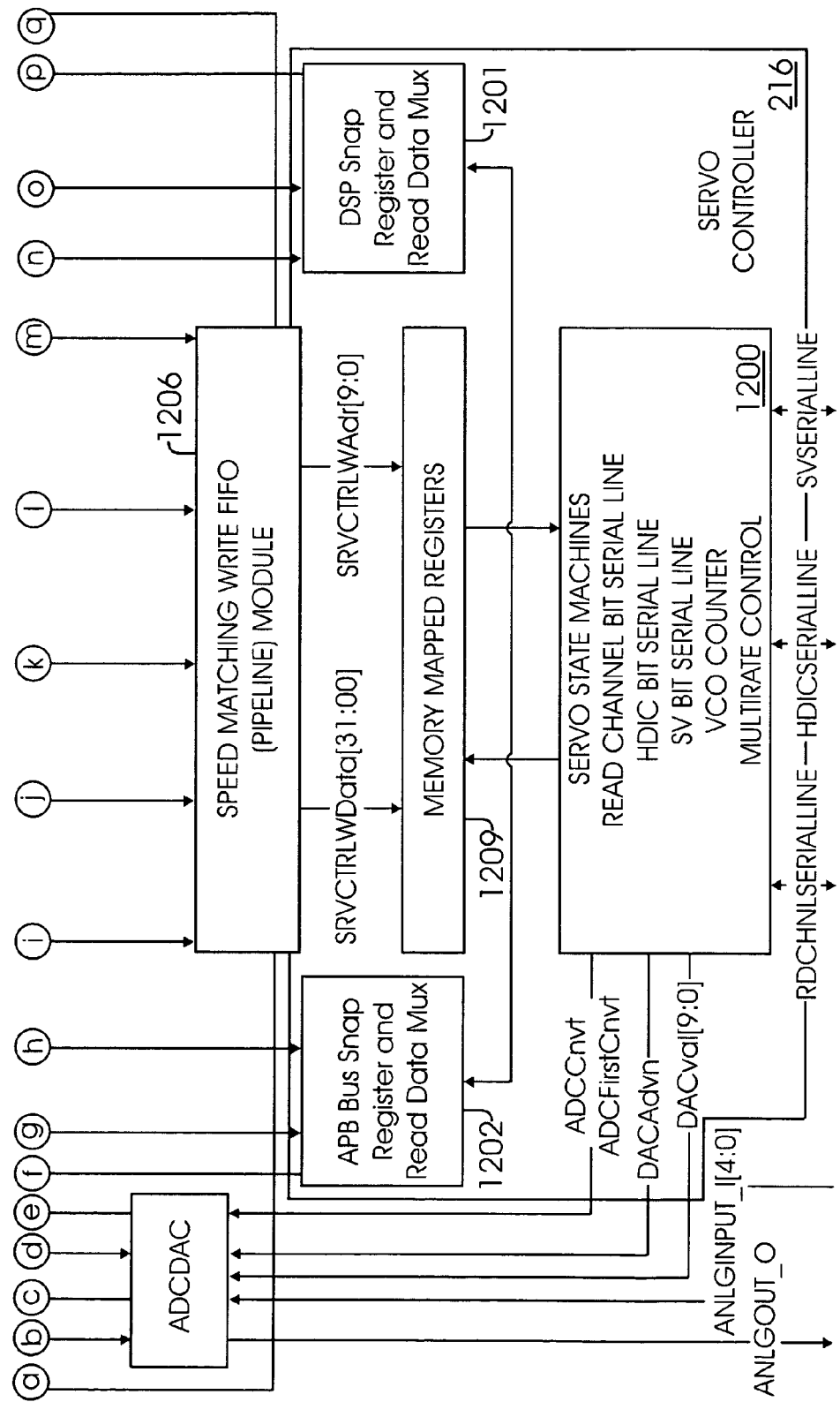
FIGURE 12A-(ii)

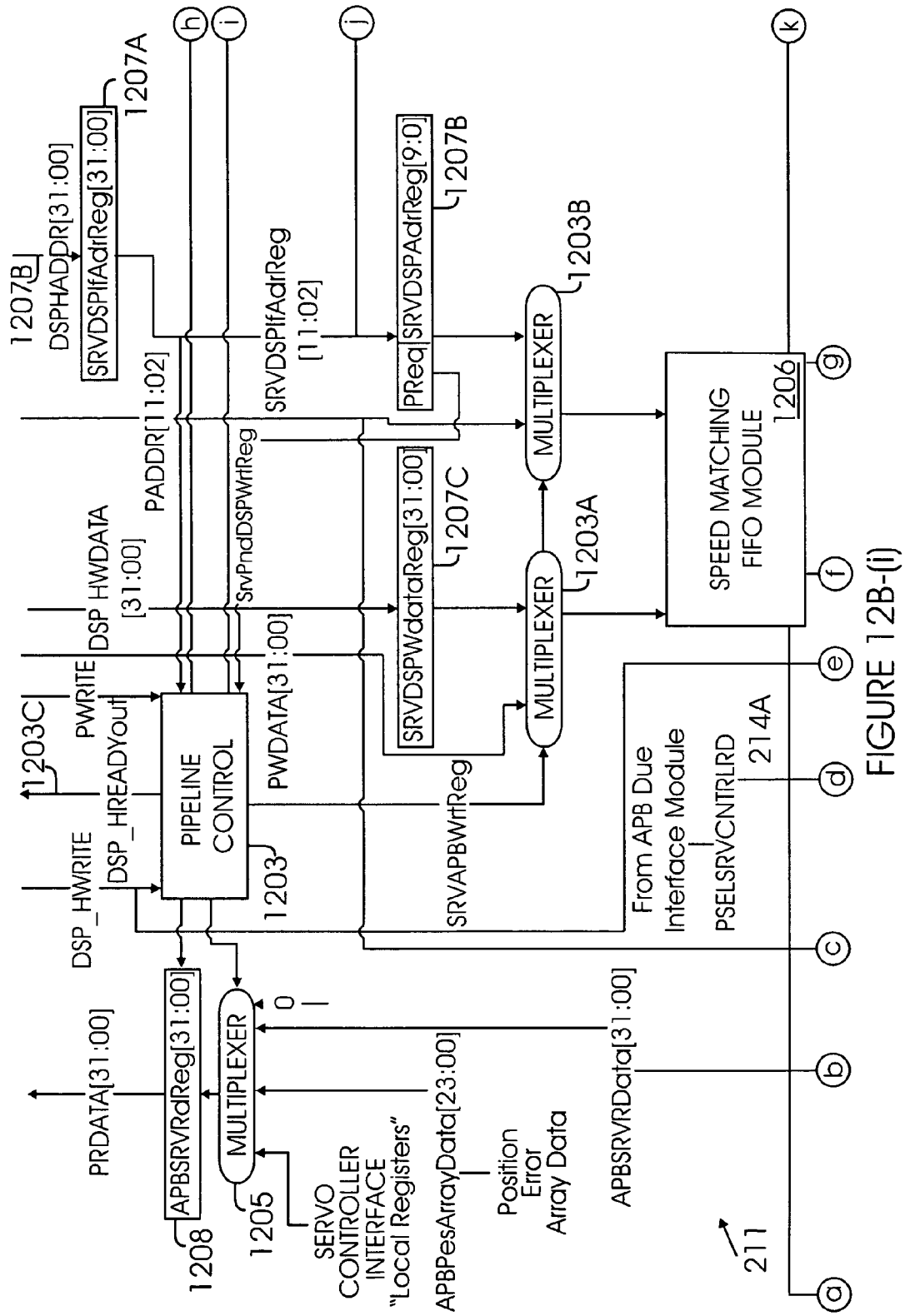
FIGURE 12B-(i)

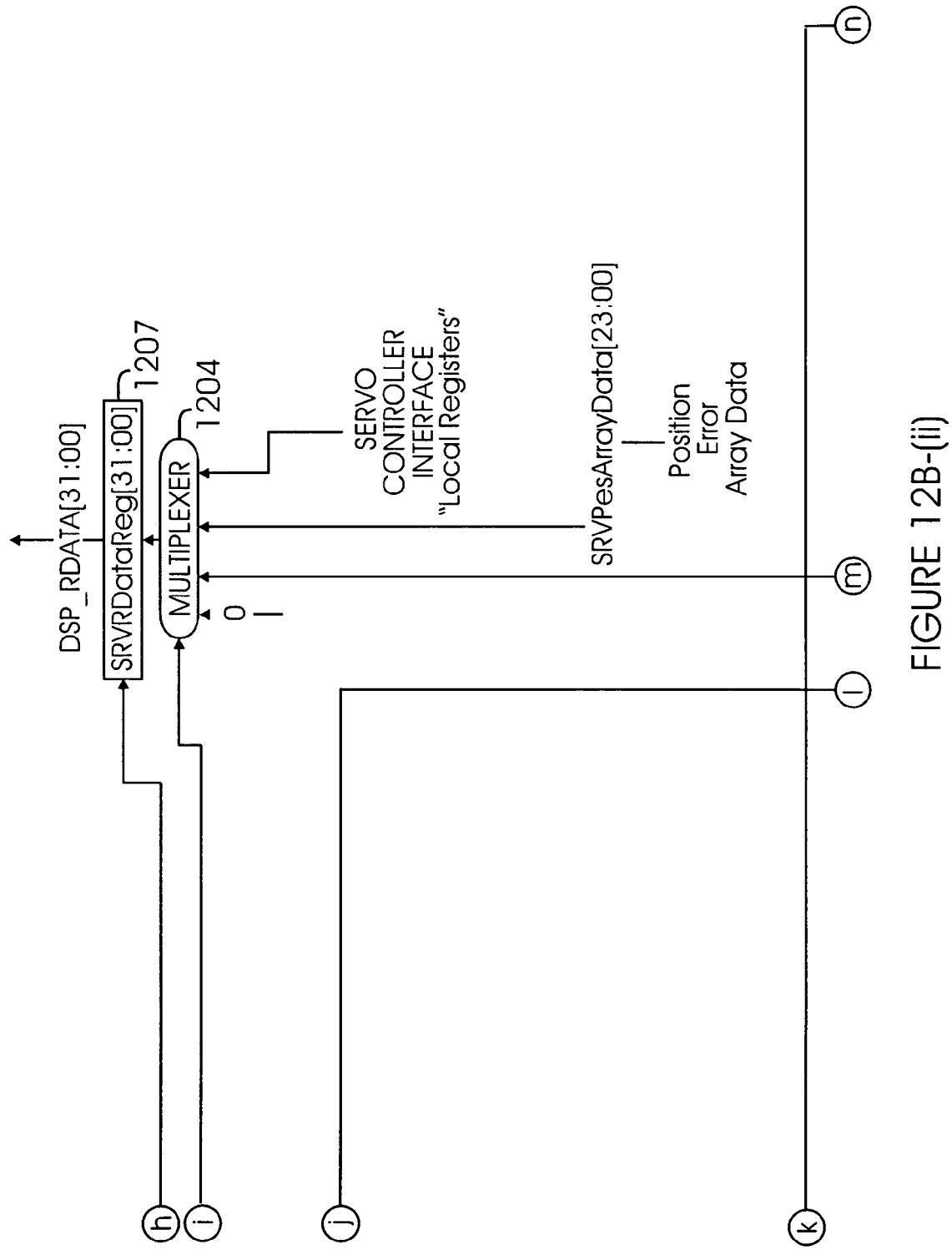
FIGURE 12B-(ii)

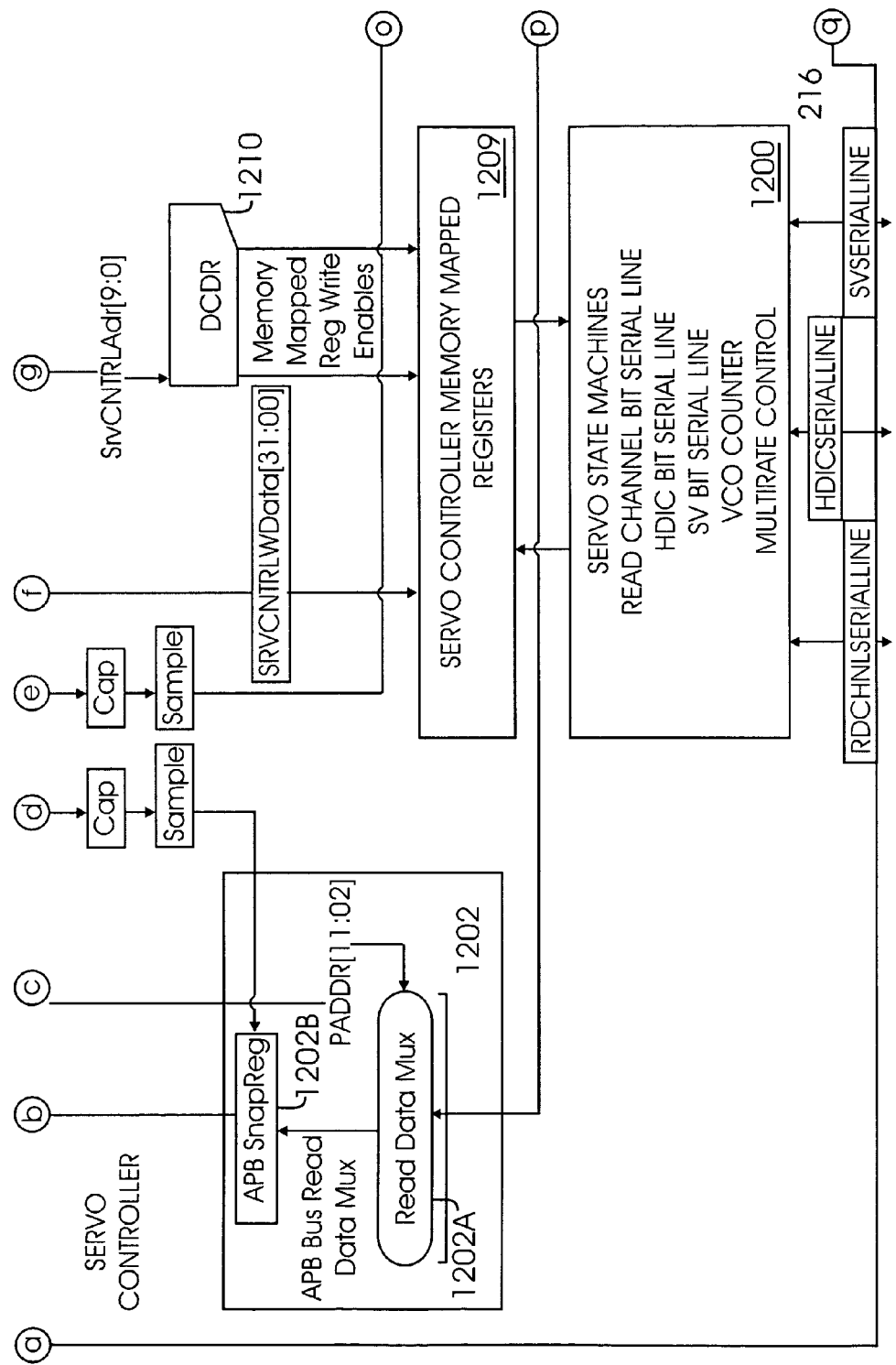
FIGURE 12B-(iii)

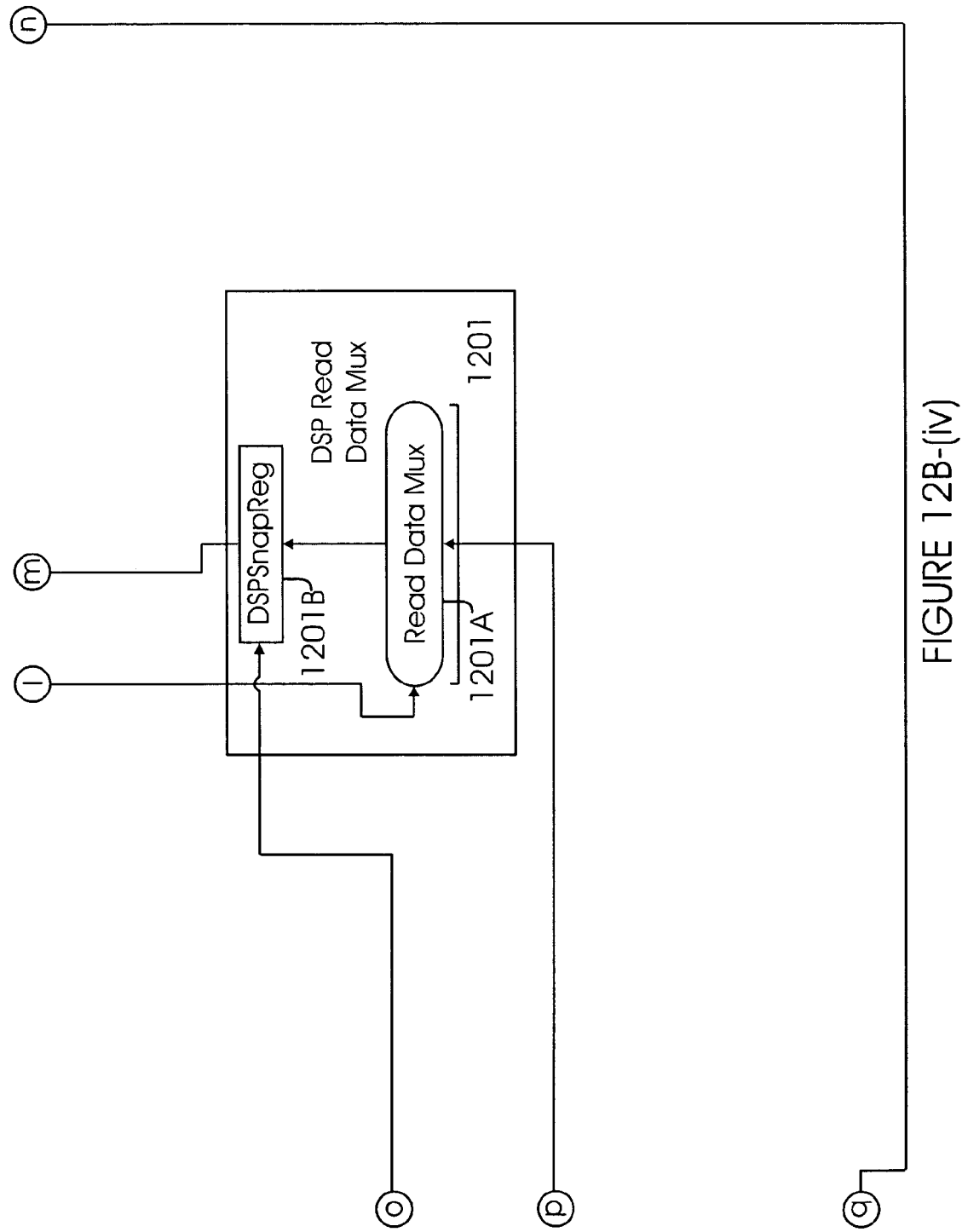
FIGURE 12B-(iv)

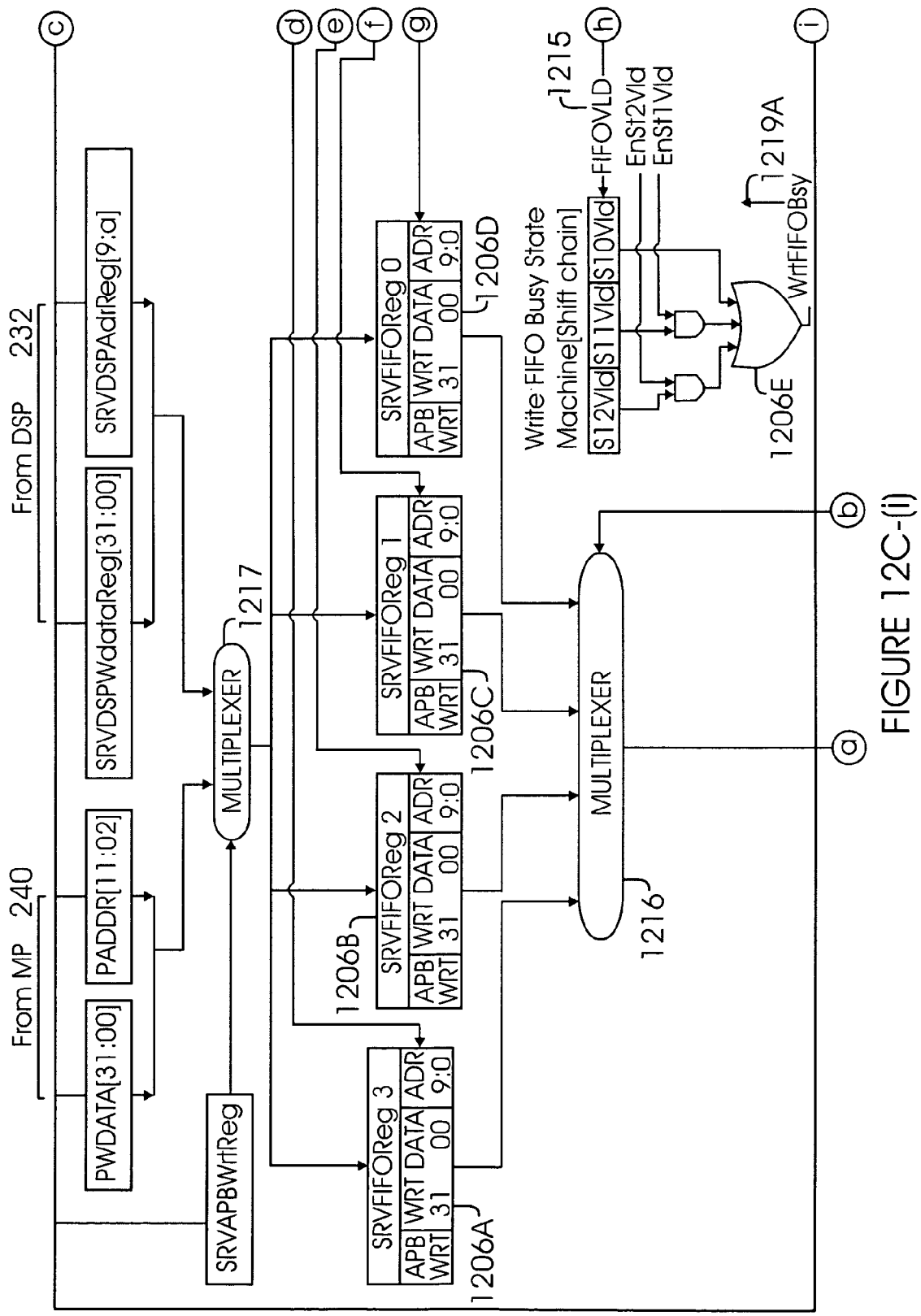
FIGURE 12C-(i)

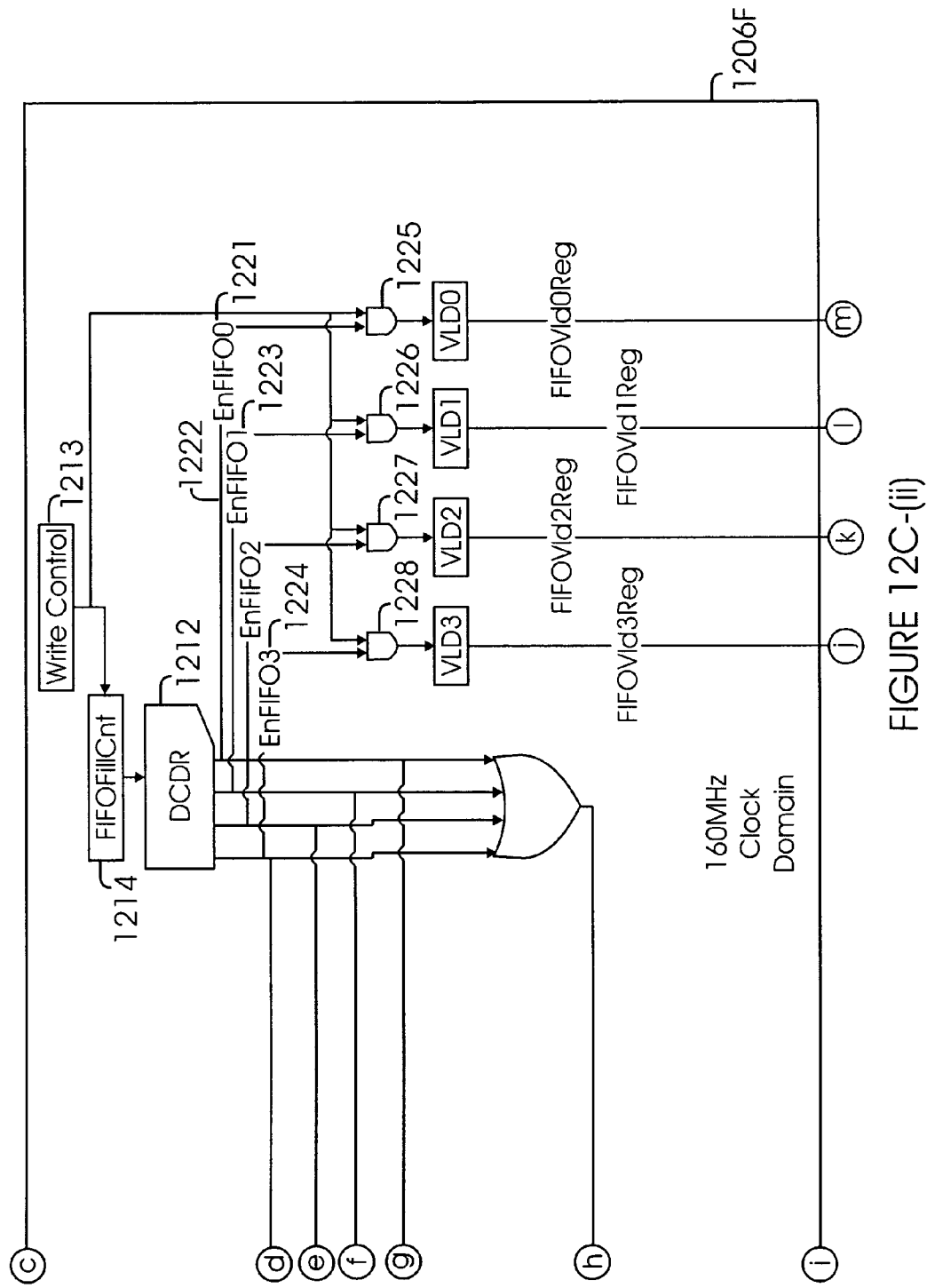
FIGURE 12C-(ii)

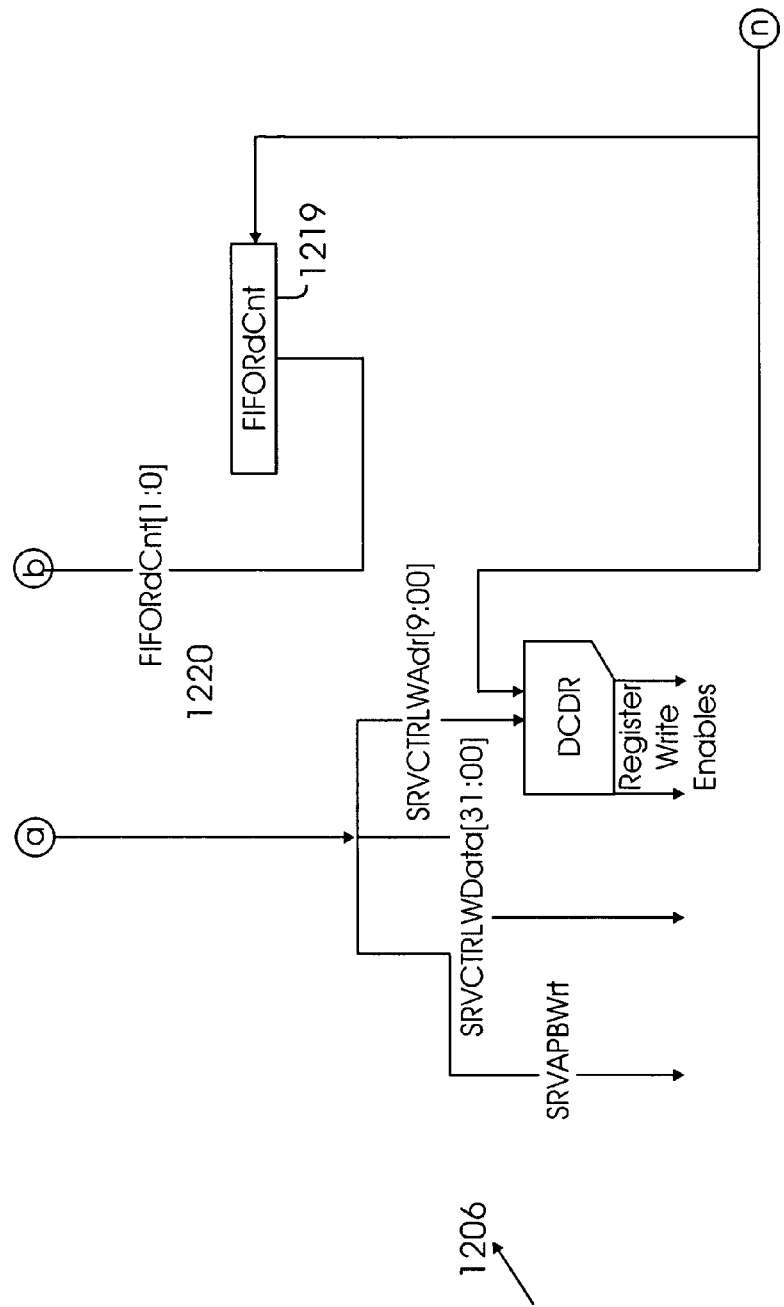
FIGURE 12C-(iii)

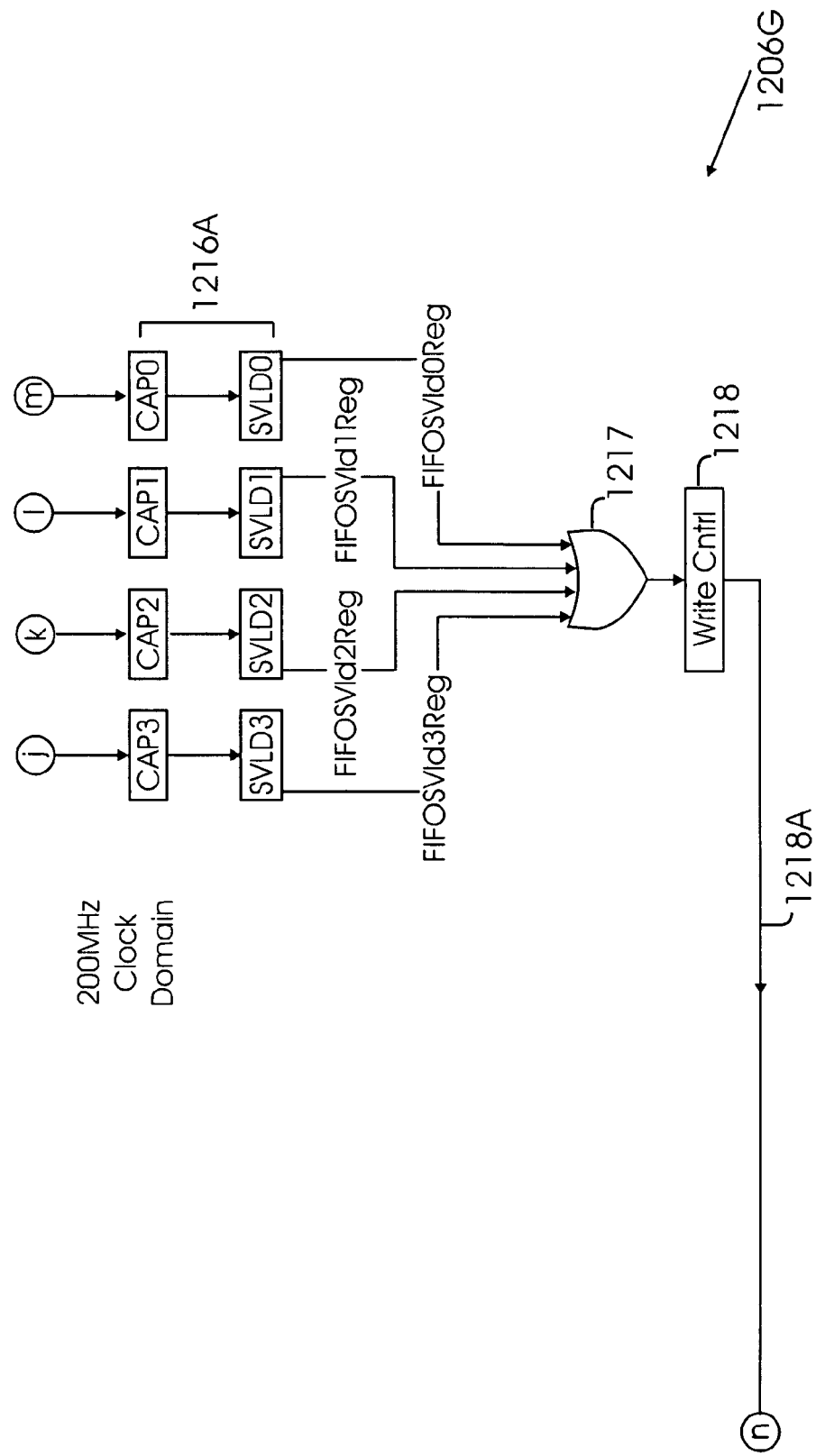
FIGURE 12C-(iv)

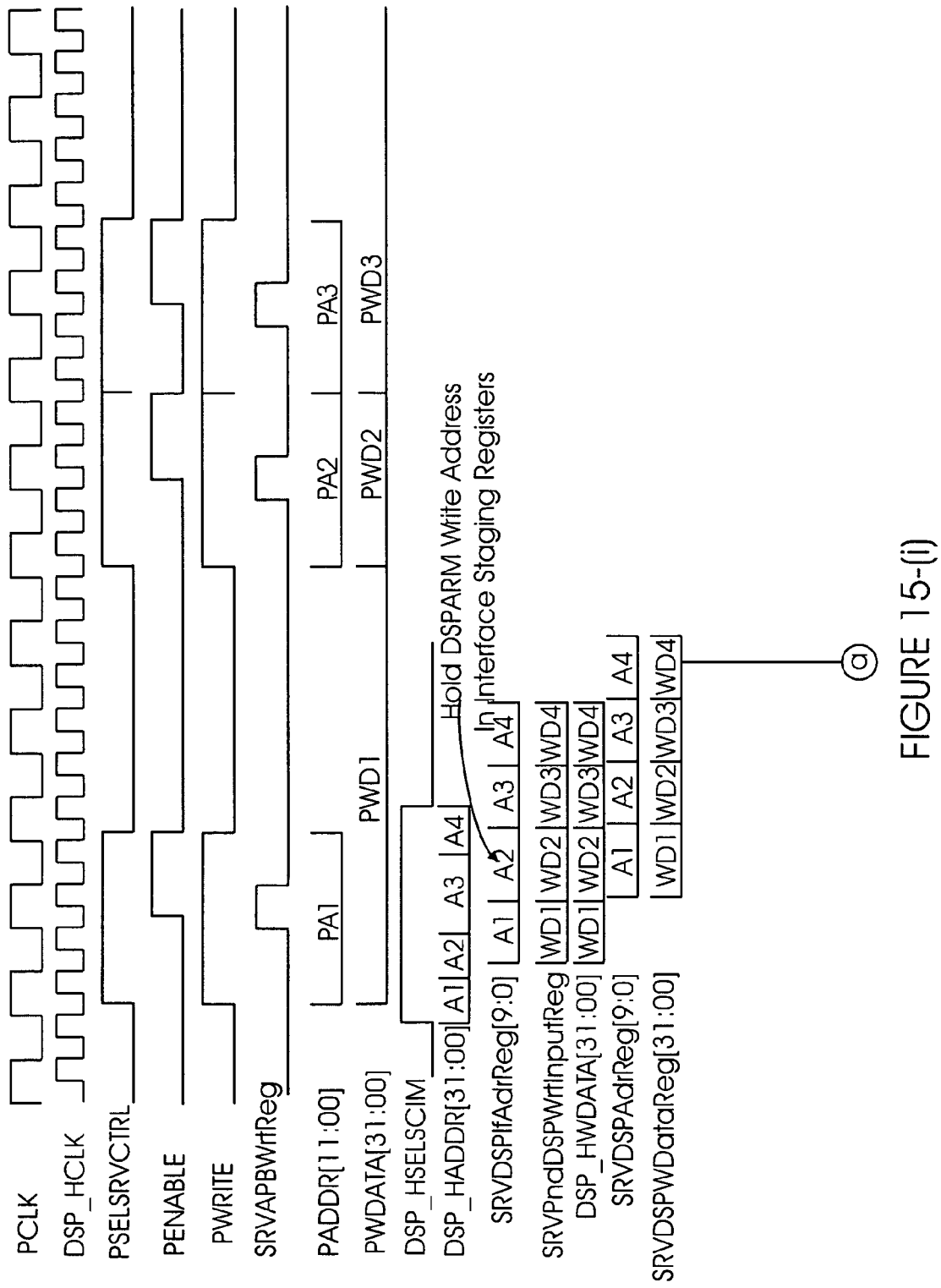
FIGURE 15-(i)

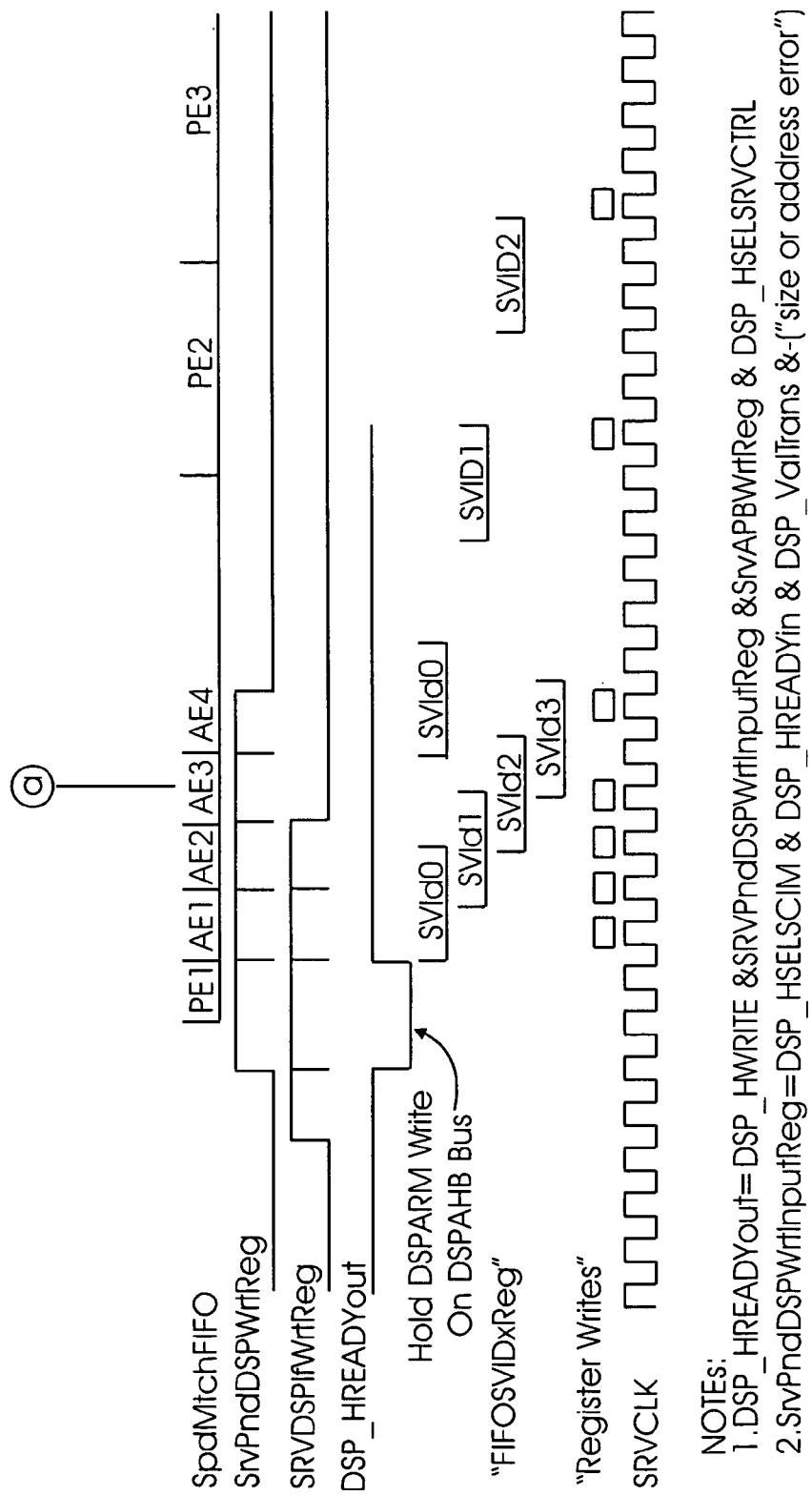
FIGURE 15-(ii)

| Conflict | | APB 208 Waits | DSPAHB Bus 233 Waits |
|---|---|---|---|
| APB 208 | DSP 232 | | |
| Write | Write | No | Yes -1 wait cycle |
| Read local register | NA | No | No |
| NA | Read local register | Yes -1 PCLK clock cycle | Yes -1 DSP_HCLK clock cycle |
| Read Servo Controller register | NA | No | No |
| NA | Read Servo Controller register | | Yes - 3 DSP_HCLK clock cycles |

FIGURE 20

| Bits | Function |
|---|---|
| [04] | SCIARMADCInt-SCI 211 sets (one clock cycle pulse) this bit when conversion data is available from ADCDAC 213. Setting this bit generates a level sensitive interrupt (SRVCTRLARMINT) to Processor 240. |
| [03] | ARMWrtFIFOBsy - Write FIFOBsy signal bit indicates that a pending write is still in the Speed Matching write FIFO 1206 |
| [02] | SCIARMSmphCtlt - When SCI 211 sets this bit, it asserts the PADREXCPT signal to APB Bridge 235 indicating that Processor 240 attempted a register write (any register other than the SCISemaphoreReg or this register ) when DSP 232 had ownership of the SCIHdwSmphr bit (hardware semaphore, SCISemaphoreReg[00]). |
| [01] | SCIARMAdrExcpt - SCI 211 sets (one clock cycle pulse) this bit when an Address Exception is detected on Processor 240 access to SC 216 register. |
| [00] | SCIARMInt - SCI 211 generates a level sensitive interrupt (SRVCTRLARMINT) to Processor 240 when SC 216 asserts the hardware interrupt signal, SRVCARMINT. |

FIGURE 23

| Bits | Function |
|---|---|
| [31:04] | Reserved |
| [03] | DSPWrtFIFOBsy - Write FIFOBsy bit indicates that a pending write is still in the Speed Matching write FIFO 1206. |
| [02] | SCIDSPSmphCtlt - When SCI 211 sets (one clock cycle pulse) this bit, when DSP 232 attempts a register write (any register except SCISemaphoreReg and this register) without having ownership of SCISemaphoreReg[00],the hardware semaphore bit SCIHdwSmphr. Setting this bit generates a level sensitive interrupt (SRVCTRLDSPINT) to the DSP Interface Module 210. |
| [01] | SCIDSPAdrExcpt - SCI 216 sets (one clock cycle pulse) this bit when an Address Exception is detected on DSP 232 access to SC 216. Setting this bit generates a level sensitive interrupt (SRVCTRLDSPINT) to DSP 232. |
| [00] | SCIDSPInt - SCI 211 generates a level sensitive interrupt (SRVCTRLDSPINT) to DSP 232 when SC 216 asserts the hardware interrupt signal, SRVCDSPINT. |

FIGURE 24

| Bits | Function |
|---|---|
| [31:04] | Reserved |
| [03:01] | SCIsftSmphr[02:00] - SCI 211 Soft Semaphore that provide procedural interlocks only. These semaphores do not provide a hardware interlock (see description below). |
| [00] | SCIHdwSmphr - SCI 211 Hardware Semaphore that provides a hardware interlock. When APB 208 acquires the semaphore the DSP 232 cannot execute a write access to any register in SC 216 or SCI 211 except the Semaphore Register or its respective status register. The reverse is true when DSP 232 owns this semaphore. |

FIGURE 24A

| BR Write Data | Alternate bus State | Current Bus State | Results | Comment |
|---|---|---|---|---|
| 0 | 0 | 0 | 0 | Write bit position=0, no action |
| 0 | 1 | 0 | 0 | Write bit position=0, no action |
| 1 | 1 | 0 | 0 | Attempted to acquire semaphore while the alternate bus has ownership |
| 1 | 0 | 0 | 1 | Attempt to acquire semaphore is successful |
| 0 | 0 | 1 | 1 | Write bit position=0, no action. Semaphore remains undisturbed |
| 1 | 0 | 1 | 0 | Clear semaphore operation |

FIGURE 25

| Bits | Function |
|---|---|
| [31:10] | Reserved |
| [09] | EnAddDSPWt - Enable Additional DSPARM Wait bit may be set (=1) to provide an additional DSP 232 wait cycle when reading a memory mapped register from SC 216.<br>When this bit = 0 waits states on reads to SC 216 memory mapped registers = 3.<br>When this bit = 1 waits states on reads to SC 216 memory mapped registers = 4. |
| [08] | EnDSPFrstADCCnvCmpltInt- Enable DSP 232 First ADC Conversion Complete Interrupt bit enables SCI 211 to send an interrupt (ADCCNVTDSPINT) to DSP 232 each time a conversion completes as the result of a Servo Frame (ADCFirstCnvt signal from SC 216) |
| [07] | EnDSPADCCnvCmpltInt- Enable DSP 232 First ADC Conversion Complete Interrupt bit enables SCI 211 to send an interrupt (ADCCNVTDSPINT) to DSP 232 each time a conversion completes . |
| [06] | EnARMFrstADCCnvCmpltInt - Enable Processr 240 first ADC Conversion Complete Interrupt bit enables SCI 211 to send an interrupt (SRVCTRLARMINT) to Interrupt controller 207 each time a conversion completes as the result of a servo frame (ADCFirstCnvt signal from SC 216) |
| [05] | EnARMADCCnvCmpltInt - Enable Processor 240 ADC Conversion Complete Interrupt bit enables the SCI Controller Interface 211 to send a Processor 240 interrupt (SRVCTRLARMINT) signal Interrupt Controller 207 each time a conversion completes. |
| [04] | EnOnTrackSMVal - When this bit is set the Enable On Track Servo Machine values [DACval[9:0] are accepted each time a DAC Advance signal (DACAdvn) is sent rather than from the DAC FIFO values. |
| [03] | EnDSPPSDataInt- Enable DSP Position Data Interrupt enables SCI 211 to send interrupt SRVDSPARMPSDATAINT signal to DSP 232 each time SC 216 sends SRVPsDataInt. |

FIGURE 27-(i)

| | |
|---|---|
| [02] | EnSCIDSPInt - Enables SCI 211 to generate an interrupt (SRVCTRLDSPARMINT) signal to DSP 232. When this bit = 0 it blocks all sources of interrupt generation. When this bit = 1 enable all sources to generate an interrupt. |
| [01] | EnADCCnvsn - When this bit = 0 the ADC converter 213 is powered down and may not generate conversion data or interrupts. |
| [00] | EnDSPIntfc - Enable the DSPARM Interface (DSPAHB Bus ) bit may be set or cleared by APB 208.DSP 232 may clear this bit, but it cannot set this bit as it gains access to SCI 211 with MP 240 setting this bit. When this bit is set, DSP 232 has read/write access. When this bit is clear DSP 232 does not have write access to any registers except the SCIDSPStatusReg. An access attempted by DSP 232 without this bit set will result in an Address Exception interrupt being returned to DSP 232. |

FIGURE 27-(ii)

Servo Controller Interface MultiRate ADC Mask Register (SCIMultRtADCMskReg)

| Bits | Function |
|---|---|
| [31:07] | Reserved |
| [06:02] | ADC Mask bits specify the ADC 213 channel values that will be retained (1 mask bit for each channel) after a requested conversion with the exception of the conversion taken at SBD time (ADCcnt). All 5-channel conversion values are retained at SBD time (ADCFirstCnvt). |
| [01:00] | Multiple Rate Control - This two bit field specifies the number of valid DAC Multiple Rate FIFO entries. 00=Disabled, 01 = 1 X Multiple Rate, 10 = 2 X Multiple Rate, 11 = 4 X Multiple Rate. |

FIGURE 28

| Servo Controller Interface DAC MultiRate 0 Register (SCIDACMultiRt0Reg) | |
|---|---|
| Bits | Function |
| [09:00] | Entry 0 of the DAC Multi RateFIFO - This value is specified by either Processor 240 or DSP 232 for the first value provided to the DAC 213. |

FIGURE 29

| Servo Controller Interface DAC MultiRate 1 Register (SCIDACMultiRt1Reg) | |
|---|---|
| Bits | Function |
| [09:00] | Entry 1 of the DAC Multi RateFIFO - This value is specified by either Processor 240 or DSP 232 for the second value provided to the DAC 213 during a Multi Rate operation. |

FIGURE 30

| Servo Controller Interface DAC MultiRate 2 Register (SCIDACMultiRt2Reg) | |
|---|---|
| Bits | Function |
| [09:00] | Entry 2 of the DAC Multi RateFIFO - This value is specified by either Processor 240 or DSP 232 for the third value provided to the DAC during a Multi Rate operation. |

FIGURE 31

Servo Controller Interface DAC MultiRate 3 Register (SCIDACMultiRt3Reg)

| Bits | Function |
|---|---|
| [09:00] | Entry 3 of the DAC Multi RateFIFO - This value is specified by either Processor 240 or the DSP 232 for the third value provided to the DAC during a Multi Rate operation. |

FIGURE 32

Servo Controller Interface ADC Channel 0 Register (SCIADCChn0Reg)

| Bits | Function |
|---|---|
| [09:00] | Converted value from ADC channel 0 - This value is from a channel 0 conversion of an attached analog signal. |

FIGURE 33

Servo Controller Interface ADC Channel 1 Register (SCIADCChn1Reg)

| Bits | Function |
|---|---|
| [09:00] | Converted value from ADC channel 1 - This value is from a channel 1 conversion of an attached analog signal. |

FIGURE 34

Servo Controller Interface ADC Channel 2 Register (SCIADCChn2Reg)

| Bits | Function |
|---|---|
| [09:00] | Converted value from ADC channel 2 - This value is from a channel 2 conversion of an attached analog signal. |

FIGURE 35

Servo Controller Interface ADC Channel 3 Register (SCIADCChn3Reg)

| Bits | Function |
|---|---|
| [09:00] | Converted value from ADC channel 3 - This value is from a channel 3 conversion of an attached analog signal. |

FIGURE 36

Servo Controller Interface ADC Channel 4 Register (SCIADCChn4Reg)

| Bits | Function |
|---|---|
| [09:00] | Converted value from ADC channel 4 - This value is from a channel 4 conversion of an attached analog signal. |

FIGURE 37

Servo Controller Interface Positioning Error Signal Data Array Registers

| Bits | Function |
|---|---|
| [23:00] | Positioning Error Data - These 24 bits contain the Positioning Error Data value of each register array entry. |

FIGURE 38

SERVO CONTROLLER INTERFACE MODULE FOR EMBEDDED DISK CONTROLLERS

CROSS REFERENCE TO RELATED APPLICATIONS

This patent application claims priority under 35 USC §119 (e) to provisional patent application, Ser. No. 60/453,241, filed on Mar. 10, 2003, incorporated herein by reference in it's entirety.

This patent application is also related to the following U.S. patent applications filed on Mar. 10, 2003, assigned to the same assignee, incorporated herein by reference in their entirety:

"METHOD AND SYSTEM FOR SUPPORTING MULTIPLE EXTERNAL SERIAL PORT DEVICES USING A SERIAL PORT CONTROLLER IN AN EMBEDDED DISK CONTROLLER", Ser. No. 10/385,039, with MICHAEL R. SPAUR AND IHN KIM as inventors;

"METHOD AND SYSTEM FOR AUTOMATIC TIME BASE ADJUSTMENT FOR DISK DRIVE SERVO CONTROLLERS", Ser. No. 10/384,992, with MICHAEL R. SPAUR AND RAYMOND A. SANDOVAL as inventors;

"METHOD AND SYSTEM FOR USING AN EXTERNAL BUS CONTROLLER IN EMBEDDED DISK CONTROLLERS" Ser. No. 10/385,056, with GARY R. ROBECK, LARRY L. BYERS, JOSEBA M. DESUBIJANA, and FREDARICO E. DUTTON as inventors.

"METHOD AND SYSTEM FOR USING AN INTERRUPT CONTROLLER IN EMBEDDED DISK CONTROLLERS", Ser. No. 10/384,991, with DAVID M. PURDHAM, LARRY L. BYERS and ANDREW ARTZ as inventors.

"METHOD AND SYSTEM FOR MONITORING EMBEDDED DISK CONTROLLER COMPONENTS", Ser. No. 10/385,042, with LARRY L. BYERS, JOSEBA M. DESUBIJANA, GARY R. ROBECK, and WILLIAM W. DENNIN as inventors.

"METHOD AND SYSTEM FOR COLLECTING SERVO FIELD DATA FROM PROGRAMMABLE DEVICES IN EMBEDDED DISK CONTROLLERS", Ser. No. 10/385,405, with MICHAEL R. SPAUR AND RAYMOND A. SANDOVAL as inventors.

"METHOD AND SYSTEM FOR EMBEDDED DISK CONTROLLERS", Ser. No. 10/385,022 with Larry L. Byers, Paul B. Ricci, Joseph G. Kriscunas, Joseba M. Desubijana, Gary R. Robeck, David M. Purdham and Michael R. Spaur as inventors.

BACKGROUND OF THE INVENTION

1. Field of the Invention

The present invention relates generally to disk controllers, and more particularly to an embedded disk controller with a speed matching FIFO for facilitating multiple processor access.

2. Background

Conventional computer systems typically include several functional components. These components may include a central processing unit (CPU), main memory, input/output ("I/O") devices, and disk drives. In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The main memory is typically smaller than disk drives and may be volatile. Programming data is often stored on the disk drive and read into main memory as needed. The disk drives are coupled to the host system via a disk controller that handles complex details of interfacing the disk drives to the host system. Communications between the host system and the disk controller is usually provided using one of a variety of standard I/O bus interfaces.

Typically, a disk drive includes one or more magnetic disks. Each disk typically has a number of concentric rings or tracks on which data is stored. The tracks themselves may be divided into sectors, which are the smallest accessible data units. A positioning head above the appropriate track accesses a sector. An index pulse typically identifies the first sector of a track. The start of each sector is identified with a sector pulse.

Typically, the disk drive waits until a desired sector rotates beneath the head before proceeding for a read or write operation. Data is accessed serially, one bit at a time and typically, each disk has its own read/write head.

The disk drive is connected to the disk controller that performs numerous functions, for example, converting digital data to analog head signals, disk formatting, error checking and fixing, logical to physical address mapping and data buffering. To perform the various functions for transferring data, the disk controller includes numerous components.

Typically, the data buffering function is used to transfer data between the host and the disk. Data buffering is needed because the speed at which the disk drive can supply data or accept data from the host is different than the speed at which the host can correspondingly read or supply data. Conventional systems include a buffer memory that is coupled to the disk controller. The buffer memory temporarily stores data that is being read from or written to the disk drive.

Conventionally, when data is read from the disk drive, a host system sends a read command to the disk controller, which stores the read command into the buffer memory. Data is read from the disk drive and stored in the buffer memory. An ECC module determines the errors that occur in the data and appropriately corrects those errors in the buffer memory. Once it is determined that there are no errors, data is transferred from the buffer memory to the host system.

Conventional disk controllers do not have an embedded processor or specific modules that can efficiently perform the complex functions expected from disk controllers.

Therefore, what is desired is an embedded disk controller system that can efficiently function in the fast paced, media storage environment.

SUMMARY OF THE INVENTION

In one aspect of the present invention, an embedded disk controller ("controller") having a servo controller is provided. The controller also includes a servo controller interface with a speed matching module and a pipeline control module such that at least two processors share memory mapped registers without conflicts. The processors operate at different frequencies, while the servo-controller and the servo controller interface operate in same or different frequency domains.

The speed matching module ensures communication without inserting wait states in a servo controller interface clock domain for write access to the servo controller and there is no read conflicts between the first and second processor.

The controller also includes a hardware mechanism for indivisible register access to the first or second processor. The hardware mechanism includes a hard semaphore and/or soft semaphore.

The pipeline control module resolves conflict between the first and second processor transaction. If there is a write conflict between the first and second processor, pipeline control module holds write access to the second processor.

In yet another aspect of the present invention, a system for reading and writing data to a storage medium. The system includes an embedded disk controller having a servo controller interface module that includes a speed matching module and a pipeline control module such that at least two processors share memory mapped registers without conflicts.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described. In the drawings, the same components have the same reference numerals. The illustrated embodiment is intended to illustrate, but not to limit the invention. The drawings include the following Figures:

FIGS. 3-(i) through 3-(iv) are schematics showing plural signals to and from servo-controller and servo controller interface;

FIG. 4A provides a listing of various signal from an advanced peripheral bus ("APB") used by a first processor and the servo controller interface ("SCI") of FIG. 2;

FIG. 4B provides a description of various output signals from SCI to APB, according to one aspect of the present invention;

FIG. 5A provides a description of the various input signals from an internal second processor ("DSP") bus interface to SCI, according to one aspect of the present invention;

FIG. 5B shows various outputs from SCI 211 to internal DSP bus interface;

FIG. 6 describes the various interrupt signals from SCI to DSP, according to one aspect of the present invention;

FIG. 7 provides a description of various signals from APB to Servo Controller, according to one aspect of the present invention;

FIG. 8 describes the various inputs from a speed matching first in first out ("FIFO") module to a servo controller, according to one aspect of the present invention;

FIG. 9 describes a FIFO read count signal 1220 from the servo controller to the speed matching FIFO module, according to one aspect of the present invention;

FIG. 10 shows a table describing various signals from DSP interface to the servo controller, according to one aspect of the present invention;

FIGS. 11-(i) and 11-(ii) show a table describing various output signals from the servo controller to the servo controller interface, according to one aspect of the present invention;

FIGS. 12A-(i), 12A-(ii), and 12B-(i) through 12B-(iv) show schematic diagrams of the servo controller and the servo controller interface according to one aspect of the present invention;

FIGS. 12C-(i) through 12C-(iv) show a schematic of the speed match FIFO, according to one aspect of the present invention;

FIGS. 15-(i) and 15-(ii) show a timing diagram with the APB Bus write conflicting with the DSP write operations;

FIG. 20 shows a table for various conflicts and wait states, according to one aspect of the present invention;

FIG. 23 shows a table of various bit values used by a Status register for the first processor related transactions, according to one aspect of the present invention;

FIG. 24 shows a table of various bit values used by a Status register for DSP related transactions, according to one aspect of the present invention;

FIG. 24A shows a table of values used by a semaphore register, according to one aspect of the present invention;

FIG. 25 shows various bit values for operating the register described in FIG. 24A, according to one aspect of the present invention;

FIGS. 27-(i) and 27-(ii) provide a table of various bits that are used by a control register for SCI, according to one aspect of the present invention; and FIG. 28-38 show various register values that are used, according one aspect of the present invention.

DETAILED DESCRIPTION OF THE PREFERRED EMBODIMENTS

To facilitate an understanding of the preferred embodiment, the general architecture and operation of a disk controller will be described initially. The specific architecture and operation of the preferred embodiment will then be described.

Figure 1:
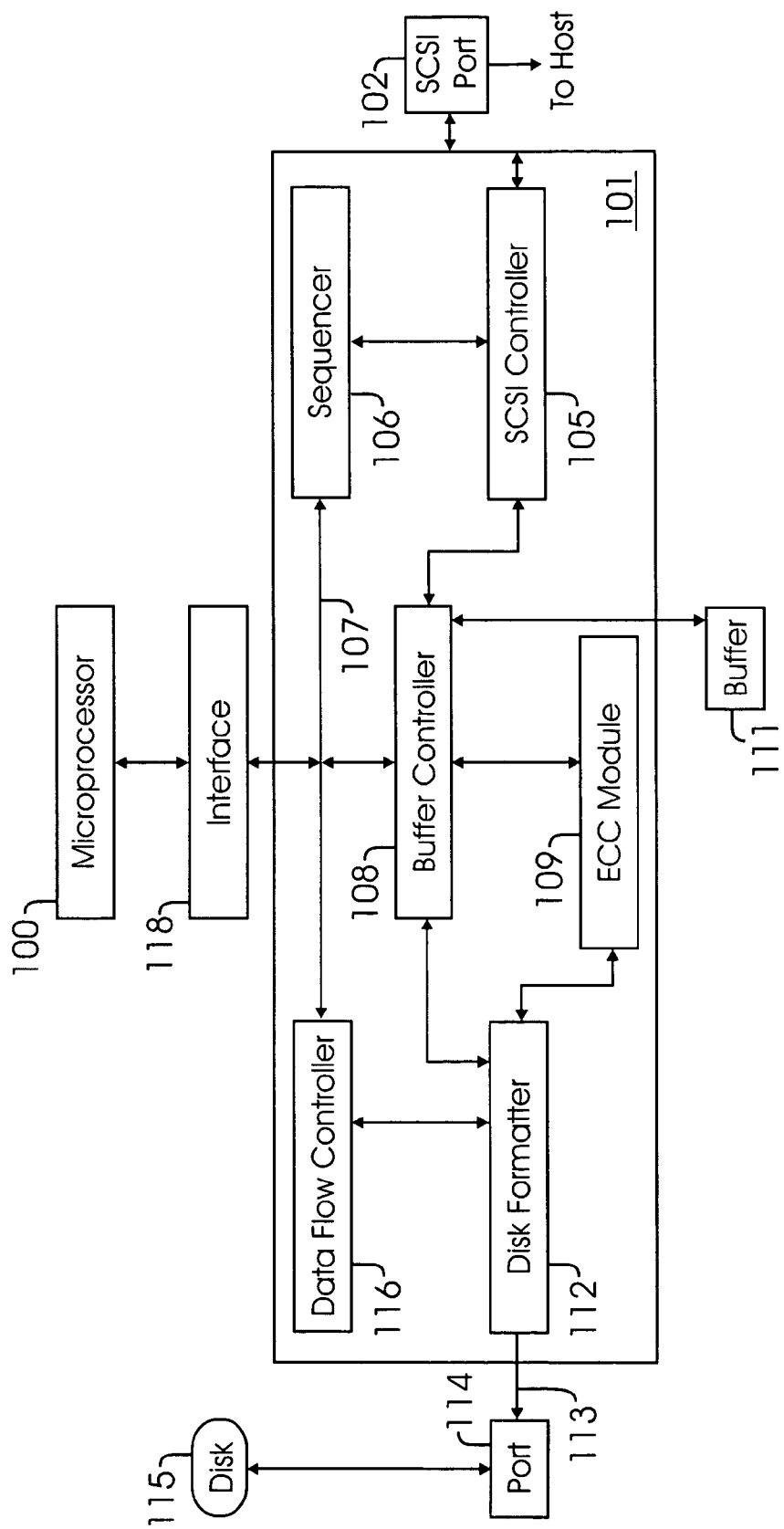
FIG. 1 is a block diagram of a hard disk controller in the prior art.

The disk drive system of FIG. 1 is an example of an internal (hard) disk drive included in a computer system. The host computer (not shown) and the disk drive communicate via port 102, which is connected to a data bus (not shown). In an alternate embodiment (not shown), the disk drive is an external storage device, which is connected to the host computer via a data bus. The data bus, for example, is a bus in accordance with a Small Computer System Interface (SCSI) specification. Those skilled in the art will appreciate that other communication buses known in the art can be used to transfer data between the disk drive and the host system.

As shown in FIG. 1, the disk drive includes disk controller 101, which is coupled to SCSI port 102, disk port 114, buffer memory 111 and microprocessor 100. Interface 118 serves to couple microprocessor bus 107 to microprocessor 100. It is noteworthy that microprocessor 100 is not on the same chip as disk controller 101. A read only memory ("ROM") omitted from the drawing is used to store firmware code executed by microprocessor 100. Disk port 114 couples disk controller 101 to disk 115.

As is standard in the industry, data is stored on disk 115 in sectors. Each sector is byte structured and includes various fields, referred to as the sector format. A typical sector format includes a logical block address ("LBA") of about four bytes followed by a data field of about 512 bytes. The LBA contains position information, for example, cylinder, head and sector numbers. A field for a CRC checksum of 4 bytes typically follows the data field. A subsequent field for a number of ECC bytes, for example 40-80 bytes, is located at the end of the sector.

Controller 101 can be an integrated circuit (IC) (or application specific integrated circuit "ASIC") that comprises of various functional modules, which provide for the writing and reading of data stored on disk 115. Microprocessor 100 is coupled to controller 101 via interface 118 to facilitate transfer of data, address, timing and control information. Buffer memory 111 is coupled to controller 101 via ports to facilitate transfer of data, timing and address information.

Data flow controller 116 is connected to microprocessor bus 107 and to buffer controller 108. An ECC module 109 and disk formatter 112 are both connected to microprocessor bus 107. Disk formatter 112 is also coupled to data and control port 113 and to data bus 107.

SCSI controller 105 includes programmable registers and state machine sequencers that interface with SCSI port 102 on one side and to a fast, buffered direct memory access (DMA) channel on the other side.

Sequencer 106 supports customized SCSI sequences, for example, by means of a 256-location instruction memory that allows users to customize command automation features. Sequencer 106 is organized in accordance with the Harvard architecture, which has separate instruction and data memories. Sequencer 106 includes, for example, a 32-byte register file, a multi-level deep stack, an integer algorithmic logic unit (ALU) and other special purpose modules. Sequencer 106 support's firmware and hardware interrupts schemes. The firmware interrupt allows microprocessor 100 to initiate an operation within Sequencer 106 without stopping sequencer operation. Hardware interrupt comes directly from SCSI controller 105.

Disk formatter 112 is a disk interface controller and performs control operations when microprocessor 100 loads all required control information and parameter values into a writable control store (WCS) RAM (not shown) and issues a command. Disk formatter 112 executes the command with no microprocessor 100 intervention.

Buffer controller 108 can be a multi-channel, high speed DMA controller. Buffer controller 108 connects buffer memory 111 to disk formatter 112 and to an ECC channel of ECC module 109, a SCSI channel of SCSI controller 105 and micro-controller bus 107. Buffer controller 108 regulates data movement into and out of buffer memory 111.

To read data from disk 115, a host system sends a read command to disk controller 101, which stores the read commands in buffer memory 111. Microprocessor 100 then read the command out of buffer memory 111 and initializes the various functional blocks of disk controller 101. Data is read from disk 115 and is passed through disk formatter 112 simultaneously to buffer controller 108 and to ECC module 109. Thereafter, ECC module 109 provides the ECC mask for errors, which occurred during the read operation, while data is still in buffer controller 108. The error is corrected and corrected data is sent to buffer memory 111, and then passed to the host system.

Embedded Disk Controller

Figure 2A:
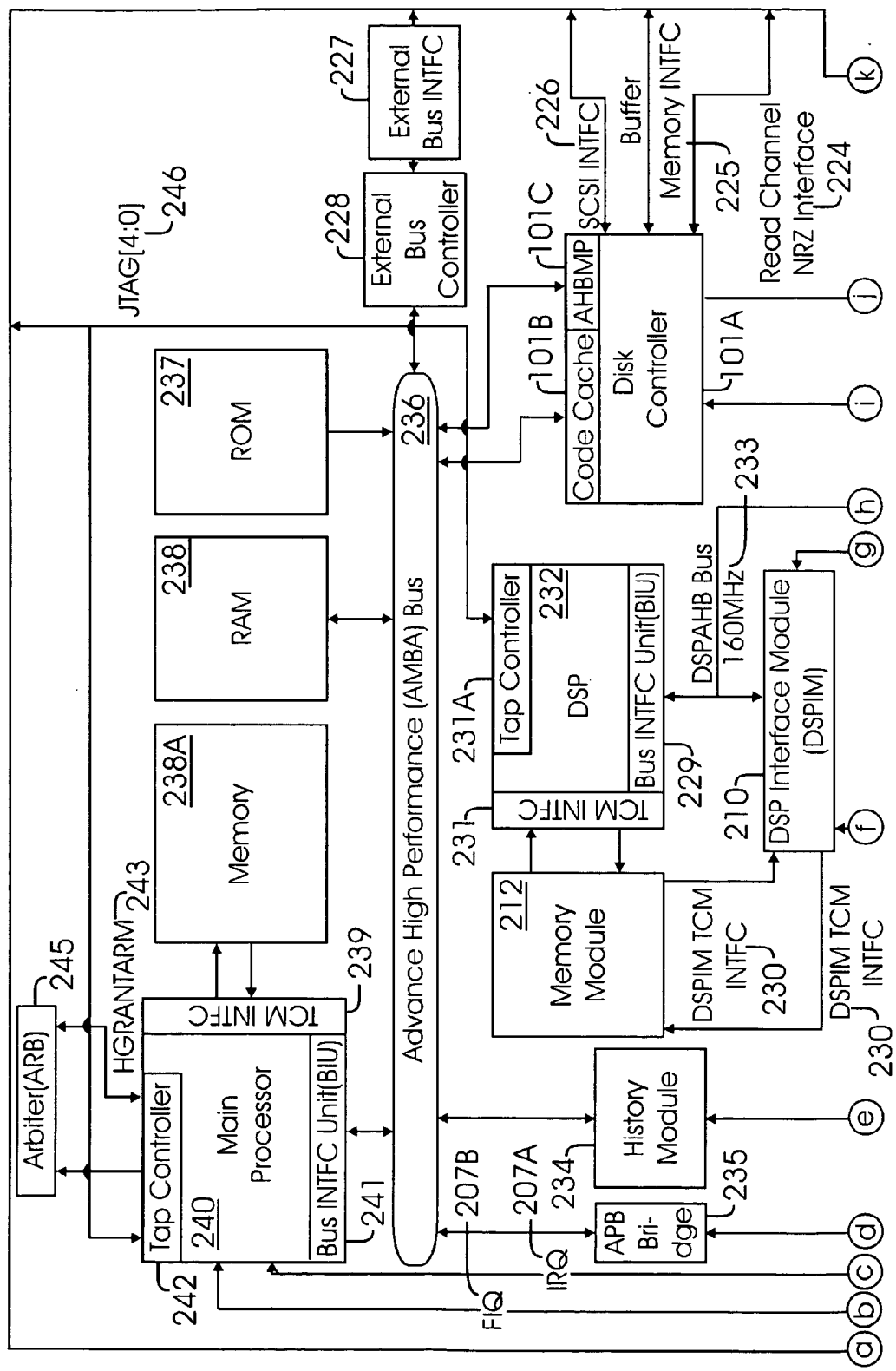
FIGS. 2A-2B (referred herein as FIG. 2) is a block diagram of an embedded disk controller, according to one aspect of the present invention.
Figure 2B:
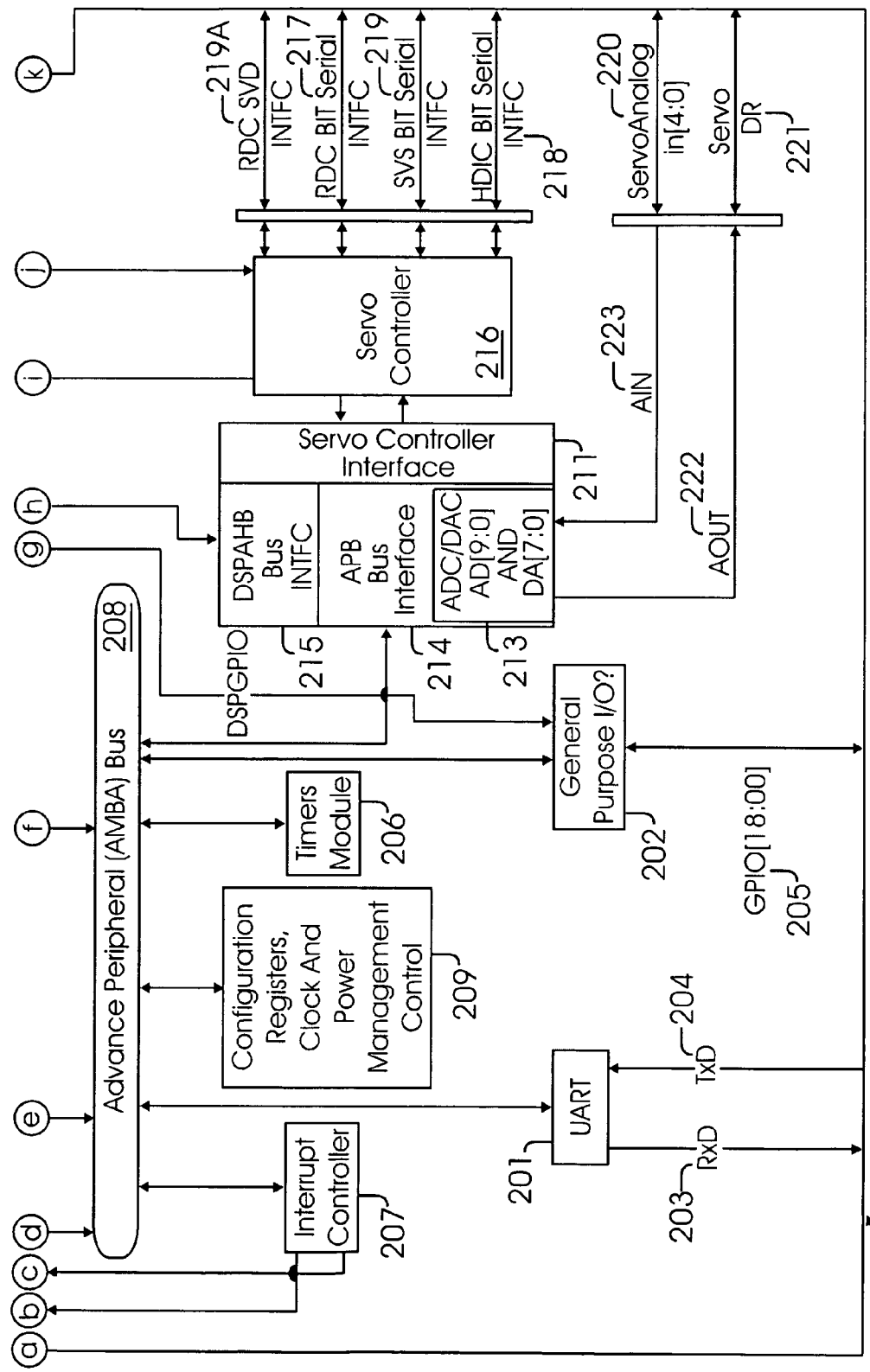

FIG. 2 shows a block diagram of an embedded disk controller system 200 according to one aspect of the present invention that not only includes the functionality of disk controller 101, but also includes various other features to meet the demands of storage industry. System 200 may be an application specific integrated circuit ("ASIC").

System 200 includes a microprocessor ("MP" and also referred to as "processor 240") 240 (which is also the overall system processor) that performs various functions described below. MP 240 may be a Pentium® Class processor designed and developed by Intel Corporation® or an ARM processor (for example, ARM966E-S®) or any other processor. MP 240 is operationally coupled to various system 200 components via buses 236 and 208. Bus 236 may be an Advanced High performance (AHB) bus as specified by ARM Inc. Bus 208 may an Advanced Peripheral Bus ("APB") as specified by ARM Inc. The specifications for AHB and APB are incorporated herein by reference in their entirety. It is noteworthy that the present invention is not limited to any particular bus or bus standard.

Processor 240 has a bus interface unit 241 that interfaces with bus 236, a memory interface 239 that interfaces with memory 238A.

Arbiter 245 arbitrates access (signal HGRANTARM 243) to AHB bus 236, while APB Bridge 235 is used to communicate between buses 236 and 208.

System 200 is also provided with a random access memory (RAM) or static RAM (SRAM) 238 that stores programs and instructions, which allows MP 240 to execute computer instructions. MP 240 may execute code instructions (also referred to as "firmware") out of RAM 238.

System 200 is also provided with read only memory (ROM) 237 that stores invariant instructions, including basic input/output instructions. System 200 includes a Joint Action Test Group ("JTAG") interface 246 for providing testing information.

MP 240 includes a TAP controller 242 that performs various de-bugging functions. MP 240 is also coupled to an External Bus Interface Bridge (or Controller) ("EBC" also referred to as "EBI" or "EBI controller") 228 via an external bus interface ("EBI/F") 227. EBC 228 allows system 200 via MP 240 and EBI/F 227 to read and write data using an external bus, for example, a storage device external to system 200, including FLASH memory, read only memory and static RAM. EBC 228 may be used to control external memory (not shown), as discussed in detail below. EBI/F 227 may be programmed to interface with plural external devices.

System 200 includes an interrupt controller ("IC") 207 that can generate regular interrupts (IRQ 207A) or a fast interrupt (FIQ 207B) to MP 240. In one aspect of the present invention, IC 207 is an embedded system that can generate interrupts and arbitrates between plural interrupts.

System 200 includes a serial interface ("UART") 201 that receives information via channel 203 and transmits information via channel 204.

System 200 includes registers 209 that include configuration, system control, clock and power management information.

System 200 also includes an address break point and history module (also referred to as "history module" or "history stack") 234 that monitors activity on busses 236 and 208 and builds a history stack. Such history stack may be used for debugging, and monitoring plural components of system 200.

System 200 also includes a timer module 206 that controlled by MP 240 and includes various timers, for example, the "Watchdog timer".

System 200 is provided with a general purpose input/output ("GPIO") module 202 that allows GPIO access (shown as signal 205) to external modules (not shown).

System 200 is also provided with a digital signal processor ("DSP") 232 that controls and monitors various servo functions through DSP interface module ("DSPIM") 210 and servo controller interface 211 operationally coupled to a servo controller 216. DSP 232 interfaces with a memory module 212 via an interface 231 and with bus 233 via interface 229. DSP 232 also includes a tap controller 231a (similar to tap controller 242).

DSPIM 210 interfaces DSP 232 with MP 240 and updates a tightly coupled memory module (TCM) 212 (also referred to as "memory module" 212) via interface 230 with servo related information. MP 240 can access TCM 212 via DSPIM 210.

Servo controller interface ("SCI") 211 includes an APB interface 214 that allows SCI 211 to interface with APB 208 and allows SC 216 to interface with MP 240. SCI 211 also includes DSPAHB interface 215 that allows access to DSPAHB bus 233. SCI 211 is also provided with a digital to analog/analog to digital converter ("ADCDAC") 213 that converts data from analog to digital domain and vice-versa. Analog data 223 (converted from data 220) enters module 213 and leaves as data 222 to a servo drive 221.

SC 216 has a read channel device (RDC) interface 217, a spindle motor control ("SVC") interface 219, a head integrated circuit(HDIC) interface 218 and servo data ("SVD") interface 219A.

System 200 also includes a hard disk controller 101A that is similar to the HDC 101 and includes a code cache 101B. Disk controller 101A has a small computer system interface ("SCSI")226, a buffer memory interface 225 and a read channel interface 224. Controller 101A can communicate with bus 236 via interface 101C.

In one aspect of the present invention, embedded processors (MP 240 and DSP 232) provide independent real time control, with one processor as the system control processor (MP 240) and the second processor (DSP 232) as a slave to the first for real time control of the disk servomechanism. DSP 232 as a slave also provides real time control for positioning a disk actuator. This includes analyzing error positioning data and outputting error correction data.

Dual processors also provide a real time overlap for processing host commands. For example, one processor may move the actuator while the other processor translates the LBA into physical information and queue host requests.

The dual processors also improve overall performance for the host. It also allows data recovery when ECC cannot correct data failures. Using unique data recovery algorithms and error recovery information data may be recovered if the ECC module 109 fails to dynamically correct the data.

Servo Controller Interface Module 211

In one aspect of the present invention, SCI 211 allows multiple processors, namely a main first processor (for example, MP 240) and a second processor (DSP 232), to access plural components in the embedded disk controller 200 without conflicts. SCI 211 also provides a "speed matching FIFO" 1206 (described below in detail with respect to FIG. 12A-12C) that resolves conflicts between various different clock domains, for example, 80 MHz domain, 160 MHz domain and 200 MHz domain. In one aspect, the speed matching FIFO 1206 is synchronous with the 80 MHz and 160 MHz clock domain. The speed matching FIFO provides maximum write access performance between asynchronous clock domains, for example, 160 MHz and 200 MHz clock domains, with no "wait states".

FIG. 3 shows a top-level block diagram of SCI 211 and SC 216 with various input and output signals. SCI 211 provides an internal interface between Processor 240 and DSP 232. SCI 211 is a peripheral on APB 208 providing Processor 240 access to SC 216. Access for processor 232 to/from SCI 211 is provided through the DSPAHB Bus interface 215 (may also be referred to as Interface 215). Interface 215 validates register addresses from Processor 240 (APB 208) and DSP 232 before sending the request to SC 216.

SCI 211 interfaces with SC 216 that may run at a different clock frequency, for example, 160 MHz or 200 MHz, through an asynchronous interface using a speed matching FIFO 1206 (may also be referred to as FIFO 1206) that may run at 160 MHz, described below. APB 208 accesses are transitioned from the 80 MHz clock domain to 160 MHz clock domain to access SC 216 through the Speed Matching FIFO 1206 that is clocked at a frequency of 160 MHz. Interface 215 is synchronous (160 MHz) with the speed Matching FIFO 1206. It is noteworthy that the foregoing frequencies are merely to illustrate the adaptive aspects of the present invention and not to limit the invention.

SCI 211 provides a mechanism for Processor 240 and DSP 232 to efficiently read and write registers in SC 216 without wait or any handshaking between SC 216 and processors 240 and 232. Processor 240 accesses SC 216 through APB 208, which uses 2 bus cycles (80 MHz). A write uses 2 bus cycles and a read 4 bus cycles. APB 208 read accesses use 2 additional wait cycles (2 bus cycles) to insure stable data at APB 208 read data register 1208. APB 208 write operations use 2 bus cycles. When there are conflicts between APB 208 write operation and DSP 232, then DSP 232 write operation is stalled for one DSP 232 clock allowing APB 208 to write an entry in FIFO 1206.

In one aspect, DSP 232 interfaces with SCI 211 through Interface 215 at 160 MHz. DSP 232 write operations use one clock cycle with no conflicts. DSP 232 read operation without any write conflicts use 2 DSP 232 clock cycles (1 wait cycle) to local SCI 211 registers. DSP 232 read accesses to SC 216 register use 3 DSP clock cycles. SCI 211 manages APB 208 write conflicts with DSP 232 write conflicts to insure that data is stable when clocked into registers.

Program control over SC 216 may be accomplished with transactions across APB 208 or through DSP AHB Interface 215. By performing writes to memory mapped registers 1209 system 200 firmware can initialize, configure and control the functionality of SC 216. DSP 232 can access SC 216 to control the disk servo mechanism for controlling positioning functions and spindle motor control functions.

SCI 211 provides at least the following interfaces that are described below with respect to FIGS. 12A-12C:

APB interface 214 for Processor 240; DSPAHB interface 214 for DSP 232; and ADCDAC 213 APB 208 Interface Signals:

All APB 208 signals are asserted and de-asserted at a certain frequency synchronous with PCLK (APB 208 clock). In one aspect PCLK may run at 80 Mhz. FIG. 4A provides a listing of various signal from APB 208 to SCI 211. FIG. 4B provides a description of various output signals from SCI 211 to APB 208. FIG. 3 shows the signals that are described in FIGS. 4A and 4B.

DSPAHB Interface 215 Signals:

Interface 215 facilitates communication between SCI 211 and DSP 232 using DSP bus 233. All the signals are asserted and de-asserted synchronous with the low to high assertion of the DSP_HCLK (FIG. 3). In one aspect, DSP_HCLK runs at 160 MHz. FIG. 5A provides a description of the various input signals from Interface 215 to SCI 211. FIG. 5B shows various outputs from SCI 211 to Interface 215. FIG. 6 describes the various interrupt signals from SCI 211 to DSP 232.

FIG. 7 provides a description of various signals from APB 208 to SC 216.

FIG. 10 shows a table describing various signals from DSPAHB interface 215 to SC 216.

FIG. 11 shows a table describing various signals that are outputs from SC 216 to SCI 211.

FIGS. 12A-12B shows detailed schematic diagrams of SCI 211 and SC 216 and the various signals between the two modules. As discussed above, SCI 211 includes ADCDAC 213, a Multi Rate DAC FIFO, and access to memory mapped registers 1209 in SC 216 used by Processor 240 and DSP 232. The ADC part of ADCDAC 213 may be a 10 bit converter with 5 channels and the DAC part may be a 10 bit converter. When SC 216 requests ADC conversions, the analog voltage on each channel is converted to a digital value. The ADC places each converted value in a register and notifies Processor 240 and/or DSP 232 that the conversion is complete and the converted values are ready to be read by sending an interrupt.

APB Interface 214 provides an interface between APB 208 and SCI 211 and operates at a frequency (f1), where f1 may be 80 MHz. Interface 215 operates at frequency (f2), where f2 may be twice as f1. Both clocks are sourced from the same PLL allowing synchronization of APB 208 and DSP 232 transactions in Pipeline Control module 1203 that resolves any conflict between the transactions.

For APB 208 write transactions there are no wait states introduced by SCI 211. When there is a write conflict with DSP 232, pipeline control module 1203 holds the write access in DSPAHB interface 215 and de-asserts DSP_HREADY signal (described in FIG. 5A), which causes DSP 232 to wait for 1 clock cycle.

Figure 13:
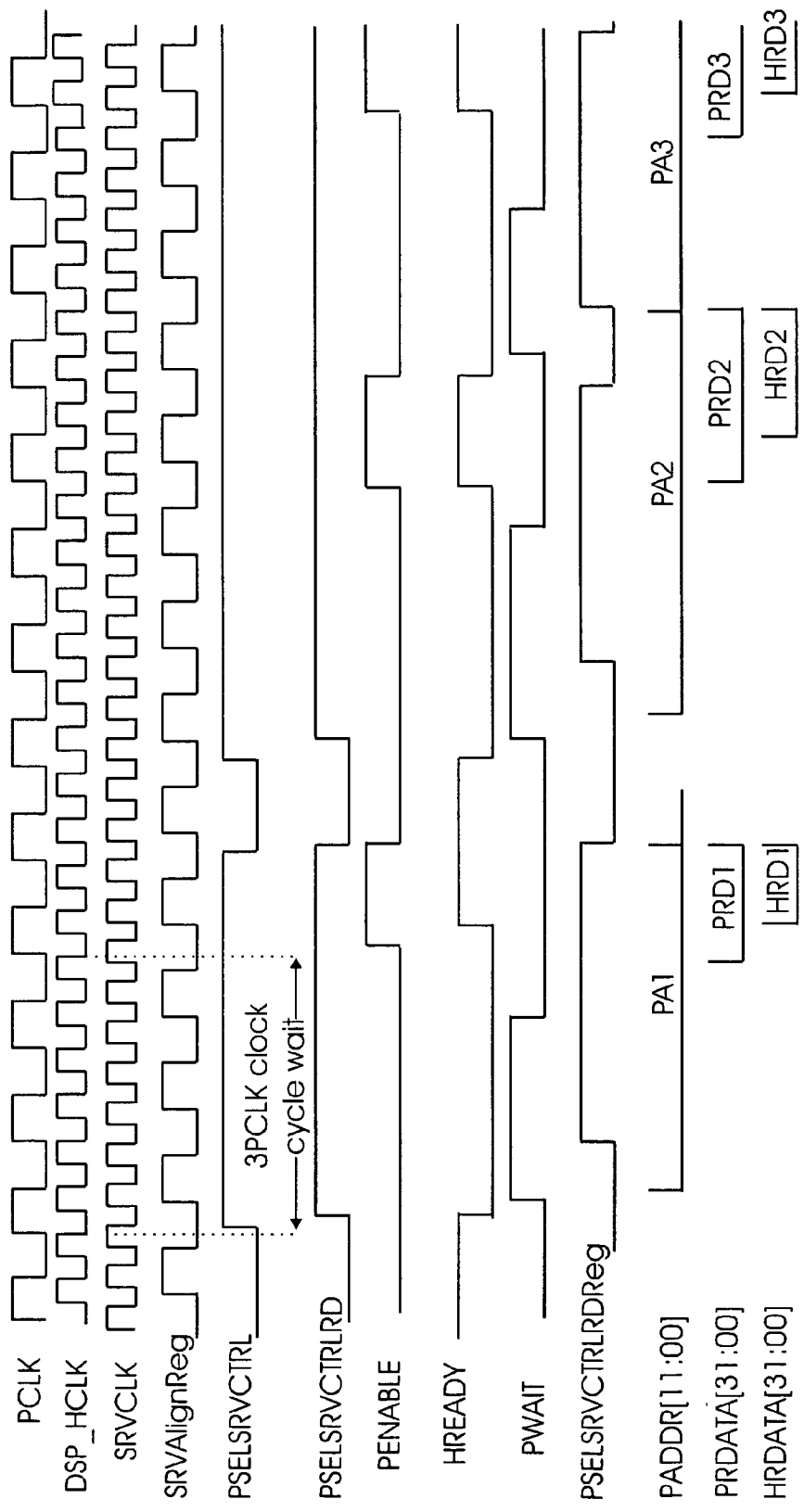
FIG. 13 shows timing diagram with no conflicts for APB Bus read transactions, according to one aspect of the present invention.
Figure 14:
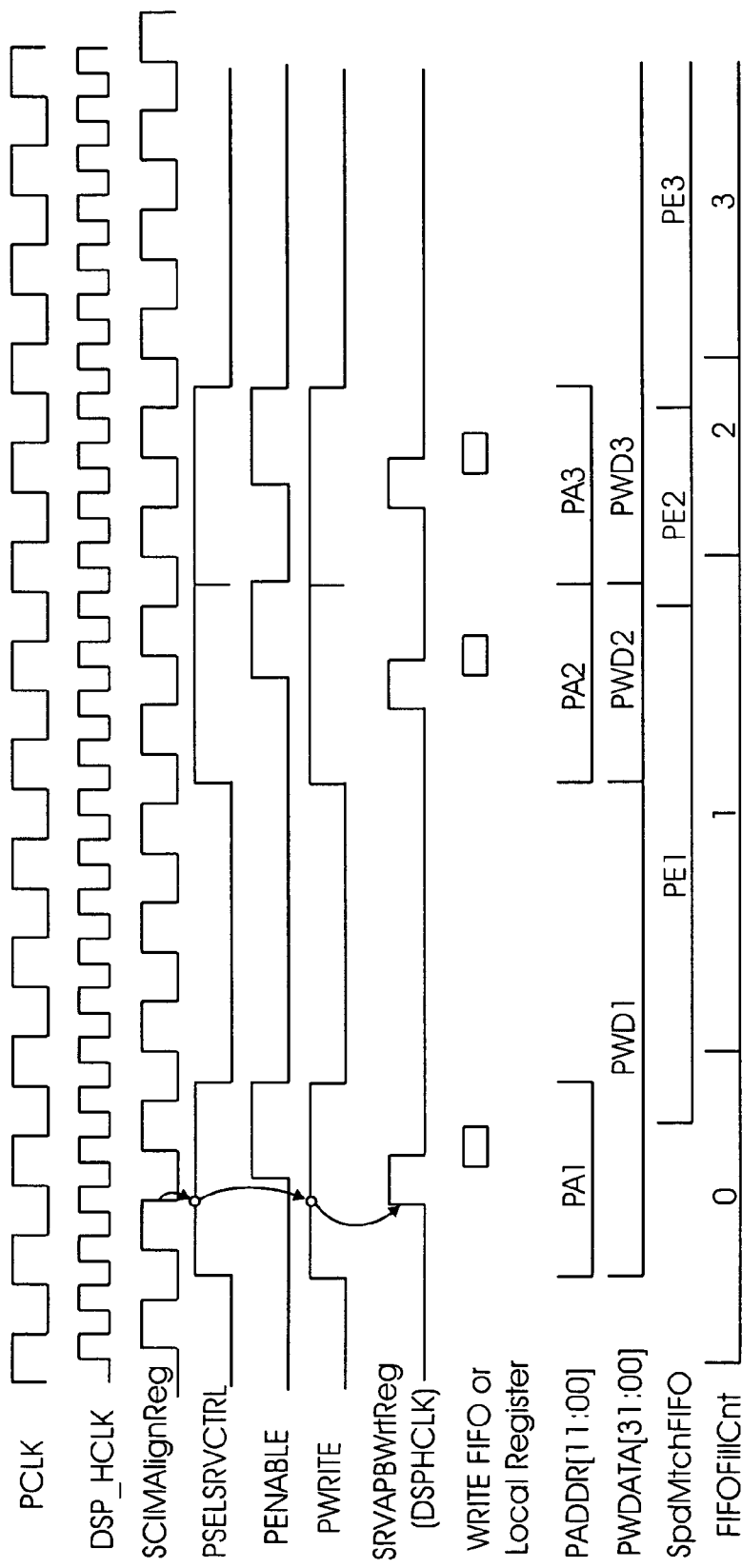
FIG. 14 shows a timing diagram with no conflicts for APB Bus write transactions, according to one aspect of the present invention.

FIG. 15 shows a timing diagram where APB 208 write operation conflicts with DSP 232 write operation. FIG. 13 shows a timing diagram of the various signals showing no APB 208 read transaction conflicts. FIG. 14 shows a timing diagram for no write conflict.

For APB 208 read transactions, SCI 211 accesses APB read data multiplexer 1202 (FIG. 12B) by asserting the PSELSRVCTRLRD signal shown as 214A in FIG. 12A. SC 216 deskews these asynchronous signals and takes a "snapshot" of the contents of the address register into a snap register (APBSNAPREg) 1202B. In one aspect this may take 15 nanoseconds (ns) to 18.75 ns (160 MHz to 200 MHz). SCI 211 waits for 2 PCLK clock cycles after PSELSRVCTRLR-DReg signal (described in FIG. 7) is asserted before information is clocked from APBSNAPREG 1202B to APB read register (APBSRVRDREG) 1208. In one aspect, this allows 25 ns for de-skewing this signal, taking the snap shot and loading register 1208 via Mux 1205.

Each time the DSP_HSELSCIM signal (described in FIG. 5A) is asserted; DSP 232 accesses SCI 211 through DSPAHB Bus 233. The DSP_HADDR (address) 1207B (FIG. 12B) (described in FIG. 5A) is validated and decoded by DSP interface 215 to determine if the address is for a local register in SCI 211 or an address that is passed to SC 216.

Figure 16:
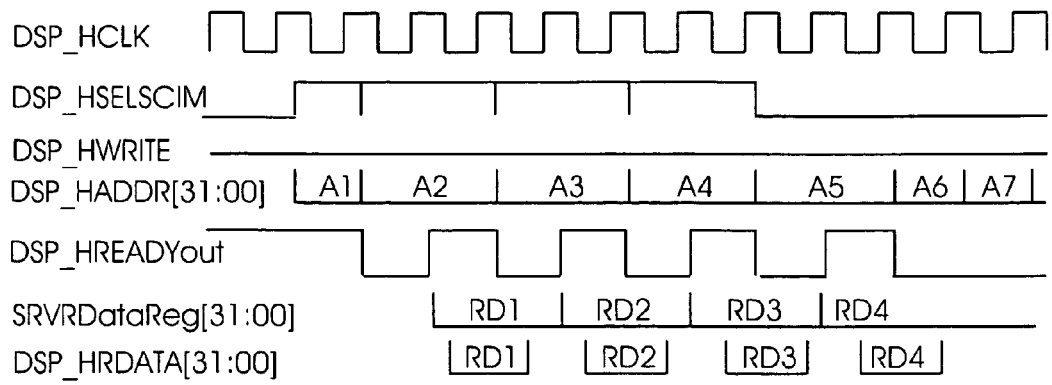
FIG. 16 shows a timing diagram for DSP read transactions for a local register in servo controller interface, according to one aspect of the present invention.

For read transactions, SCI 211 de-asserts the DSP_HREADYout signal 1203C (via pipeline control module 1203) causing DSP 232 to wait one clock cycle for local registers (See FIG. 16). For SC 216 addressed register reads, SCI 211 inserts 4 or 5 DSP_HCLK clock wait cycles depending on bits that are set in the Control Register (see timing diagram of FIG. 17).

Figure 17:
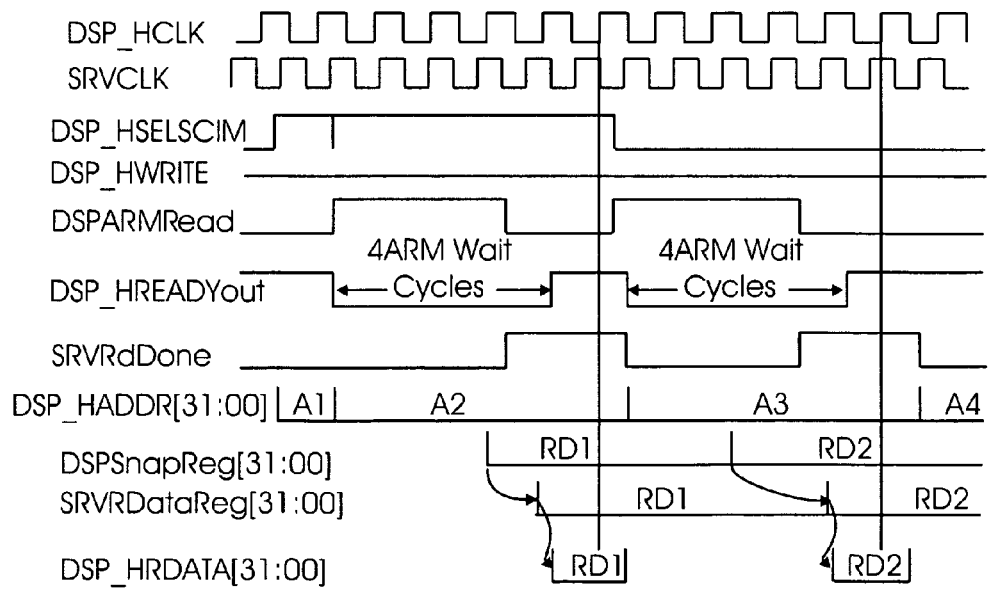
FIG. 17 shows a timing diagram for DSP read transactions, according to one aspect of the present invention.

When SCI 211 receives a read transaction from DSP 232, Pipeline Control module 1203 inserts 4 or 5 DSPAHB Bus 233 wait cycles (profile, FIG. 17, illustrated with 4 waits) while SC 216 takes a "snapshot" of the addressed register (1201B). When the SC 216 clock (SRVCLK) is running at a frequency of 160 MHz an additional wait cycle (5 wait cycles total) is used (See FIG. 17).

For a DSP 232 read transaction, SCI 211 accesses the DSPARM Read Data Mux 1201A (see FIG. 12B and 17) in SC 216 by asserting the DSPRead signal 215A (DSPRead=DSP_HSELSCIM & ~DSP_HWRITE). SC 216 examines DSP_HADDR[25:12] 1207B for zeros. If any bit (DSP_HADDR[25:12]) 1207B is set it will result in an "address exception" discussed below. When the read operation is completed, SCI 211 will return zeroes to DSP 232, pulse the DSPRdDone signal to SC 216, set the SCIDSPA-drExcpt bit (SCIDSPStatusReg[01]), and assert the SRVC-TRLDSPARMINT signal (described in FIG. 6) to DSP 232.

For a read access SC 216 deskews the asynchronous DSPRead signal 215A and takes a "snapshot" of the addressed register's contents by clocking it into the DSP-SnapReg[31:00] 1201B (FIG. 12B). In one example, this may take from 15 ns to 18.75 ns(160 MHz or 200 MHz) before the data is clocked into the DSPSnapReg[31:00] 1201B. SCI 211 waits 3 or 4 DSP_HCLK clock cycles from the assertion of the DSPRead signal 215A(asserted during the first clock cycle) before clocking the SRVRdDataReg[31:00] 1207 signal. Three clock cycles provide 18.75 ns and 4 clock cycles provides 25 ns for de-skewing the DSPRead signal, taking the snapshot and loading the DSPSnapReg[31:00]1201B (see FIGS. 12B and 17).

In one aspect of the present invention, if SC 211 is running at 200 MHz there is 3.75 ns of propagation time from DSP-SnapReg 1201B to SRVRDataReg 1207. At 160 MHz there is no propagation time from DSPSnapReg 1201B to SRVRDa-taReg 1207. Thus an additional DSP 232 wait cycle may be enabled by setting the EnAddDSPwt bit (SCICtrlReg[08]) in SCI 211 Control Register. FIG. 27 provides a description of various control register signals. This additional clock wait provides 6.25 ns to propagate DSPSnapReg[31:00] 1201B data to the SRVRDataReg[31:00] 1207.

Figure 18:
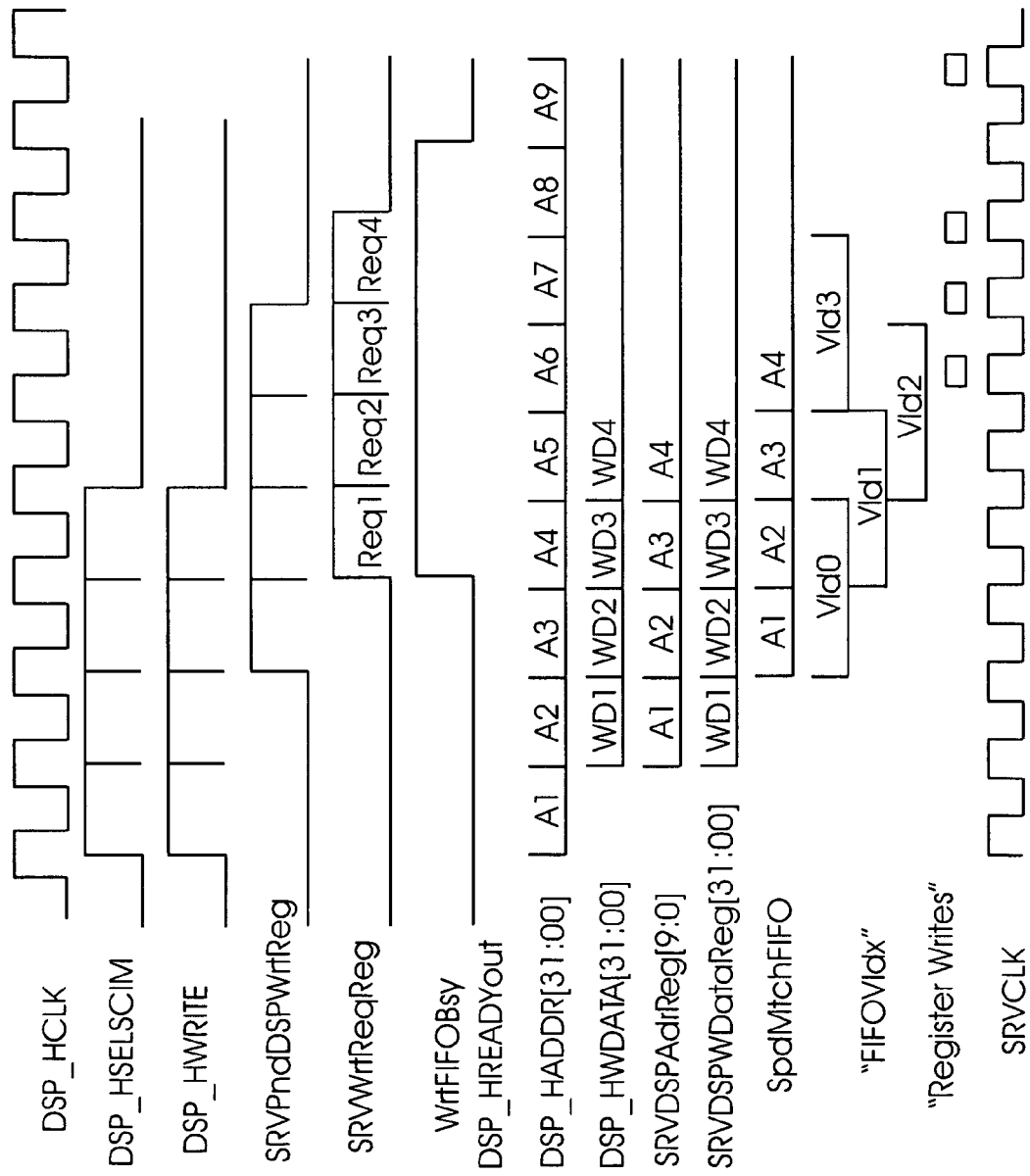
FIG. 18 shows a timing diagram for various signals involved in a no conflict, write transaction, according to one aspect of the present invention.

When there are no conflicts between APB 208 and DSP 232, write transactions have no wait cycles. These write transactions are loaded into the Speed Matching Write FIFO 1206, which deskews these transactions between the SCI 211 clock domain (160 MHz) and SC 216 clock domain (160 MHz or 200 MHz). FIG. 18 provides a timing diagram of various signals for a no conflict situation.

For read transactions, Pipeline Control module 1203 manages conflicts between write transactions and inserts wait state clock cycles for read transactions. Pipeline Control module 1203 does not insure indivisible read/update/write operations at the register level. To ensure indivisible read/update/write operations a semaphore is used with an agreed upon procedure between Processor 240 and DSP 232, as discussed below.

Pipeline Control module 1203 does not insure that a DSP 232 read following a write will get the data written by the write because writes are pipelined through the Speed Matching Write FIFO 1206, while read accesses are through multiplexer ("Mux") 1201A directly. To insure that a read following a write will get the data from the write, DSP 232 waits 4 DSP_HCLK cycles after the write before reading the same register.

In addition, APB 208 may issue a write access to the same register being read by DSP 232, which may cause unexpected results. To insure exclusive access to a register, ownership of a hardware interlock semaphore is used that is described below. FIG. 20 shows a table for various conflicts and wait states, according to one aspect of the present invention.

The first write to the APB Bridge 235 does not cause any waits on the AHB 236. Back-to-Back writes cause 1 wait on AHB 236 for each write transaction. DSPAHB Bus 233 wait cycle is introduced when there is a conflict between APB 208 and DSPAHB Bus 233 transaction. Additional waits on APB 208 cause 2 additional waits on AHB Bus 236. A read from AHB Bus 236 to APB 208 takes 3 AHB Bus cycle.

Since SC 216 is clocked (SRVCLK) at 160 MHz or 200 MHz it makes transactions between SCI 211 and SC 216 asynchronous. Synchronization of memory mapped register (1209) write transactions are handled by the Speed Matching Write FIFO 1206, which is clocked at a frequency of 160 MHz. FIG. 12C shows a detailed schematic of FIFO 1206. FIFO 1206 has four entries (1206A-1206D) that SCI 211 module rotates (writes) through.

Signals from APB 208 (PWDATA and PADDR) and DSP 232 (SRVDSPWdataReg and SRVDSPAdrReg) (via APB Interface 214 and DSP Interface 215) are received via a Mux 1217. A write control module 1213 controls which processor (processor 240 or DSP 232) writes to registers 1209. Counter 1214 maintains register count and a decoder 1212 generates FIFO 1206 address for various entries.

Signals 1221-1224 enables FIFO module 1206 to select a register and using logic 1225-1228 generates a FIFO valid signal (for example, FIFOVld0Reg for register 1206D, FIFOVld1Reg for 1206C, FIFOVld2Reg for 1206B and FIFOVld3Reg for Register 1206A that is also described in FIG. 8). Logic 1216A synchronizes the FIFO valid signals and sends it to write control logic 1218 (via logic 1217) that sends a signal 1218A to FIFO read count logic 1219 that generates signal 1220, which is fed into Mux 1216.

Pipelined writes may occur at 160 MHz (1 per clock cycle) and may be based on the following rules:

a. SC 216 accepts each write and does not insert any "waits".
b. FIFO 1206 and the asynchronous interface is based on when SCI 211 is ready to reuse (write) entry n after writing n+3, the previous entry in n has been read and written to an addressed register by SC 216.
c. SC 216 clocks at 160 MHz or 200 MHz and SCI 211 clocks at 160 MHz.

Logic 1206F in FIFO 1206 operates at frequency 160 MHz and logic 1206G that operates at 200 MHz. FIFO 1206 synchronizes write data to SC 216 clock domain. FIG. 8 describes the various inputs from FIFO 1206 to SC 216 (see FIG. 12C). FIG. 9 describes the FIFO read count signal 1220 from SC 216 to FIFO 1206.

FIFO 1206 also includes a "busy", circuit 1206E, which provides the signal WrtFIFOBsy 1219A, which may be observed by reading the WrtFIFOBsy bit, in the SCIARM-StatusReg (Processor 240 status register) or the SCIDSPStatusReg (DSP 232 status register).

Decoder 1211 selects one of the registers 1206A-1206D values to write to register 1209.

Figure 19:
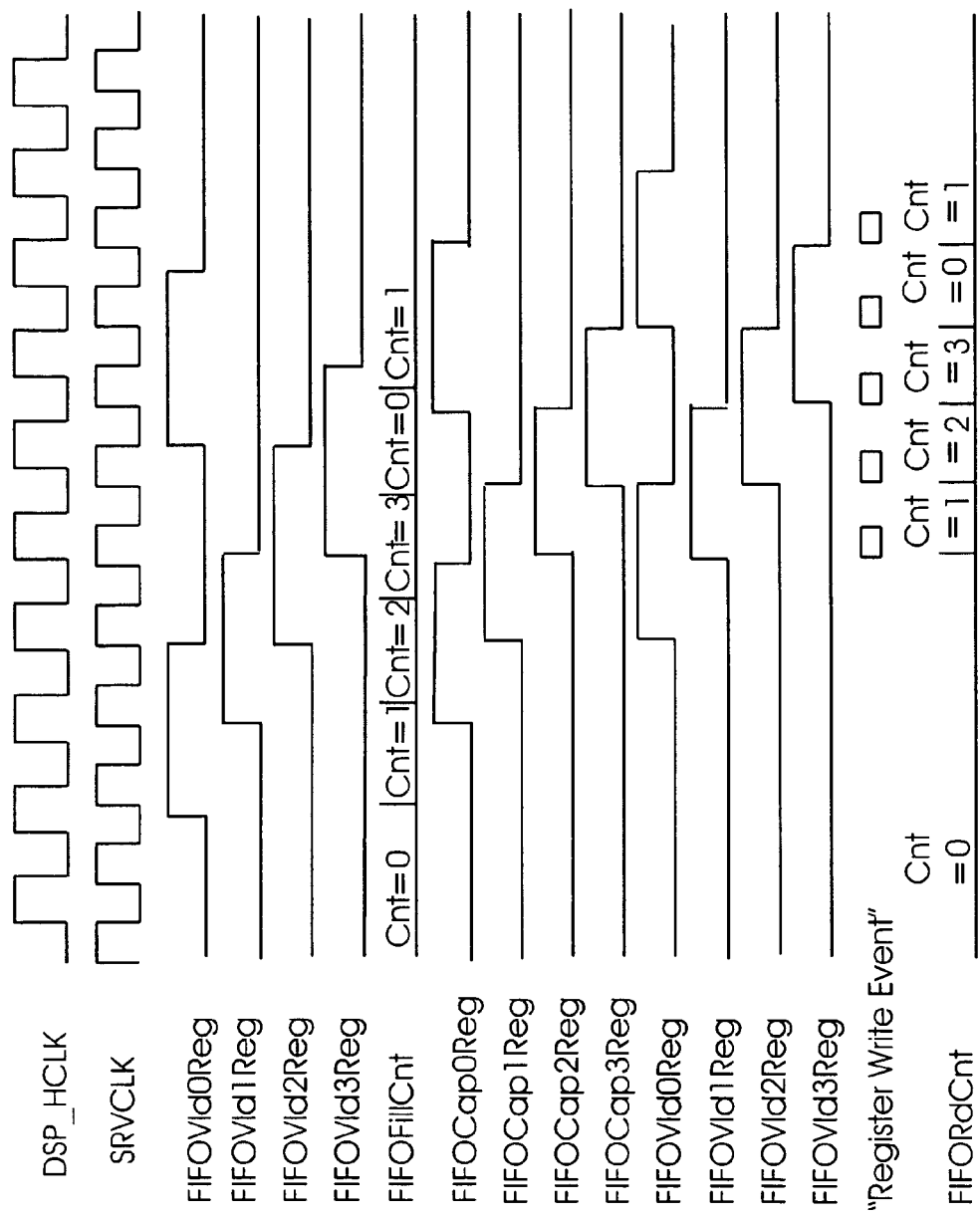
FIG. 19 shows a timing diagram for the speed matching FIFO module's profile, according to one aspect of the present invention.

FIG. 19 shows a timing diagram of various signals involved with FIFO 1206 with respect to FIG. 12C.

Register Map

SCI 211 has an APB 208 and DSP 232 address map. The base address of SCI 211 is specified in the APB Bridge 235 for Processor 240. When PSELSRVCTRL signal (described in FIG. 4A) is asserted the APB Bridge 235 has detected SCI 211 base address. SCI 211 validates the offset, PADDR[11:00] (described in FIG. 4A), and determines if the access is to a local register in SCI 211 or if the access (address) will be passed to SC 216.

In one aspect of the present invention, SCI 211 and SC 216 memory mapped register addresses are all naturally aligned word addresses, thus bits PADDR[1:0] are always expected to be zero by SCI 211.

All DSPAHB Bus 233 addresses (DSP_HADDR[31:00]) (described in FIG. 5A) architecturally are byte addresses. SCI 211 interfaces to APB 208 as a naturally aligned word (32 bit objects) addresses. When DSP_HSELSERVCTRL signal to DSPARM Interface 215 (FIG. 12A) is asserted, SCI 211 validates the address, DSP_HADDR[25:00] and DSP_H-SIZE[1:0]) (both described in FIG. 5A), and determines if the access is to a local register in SCI 211 or an address that will be passed to SC 216. If DSP_HADDR[25:00] is greater than a certain value (for example, 0x000 0FFF) SCI 211 declares an "address exception" and returns a two cycle Error Response to the DSP 232.

Figure 21:
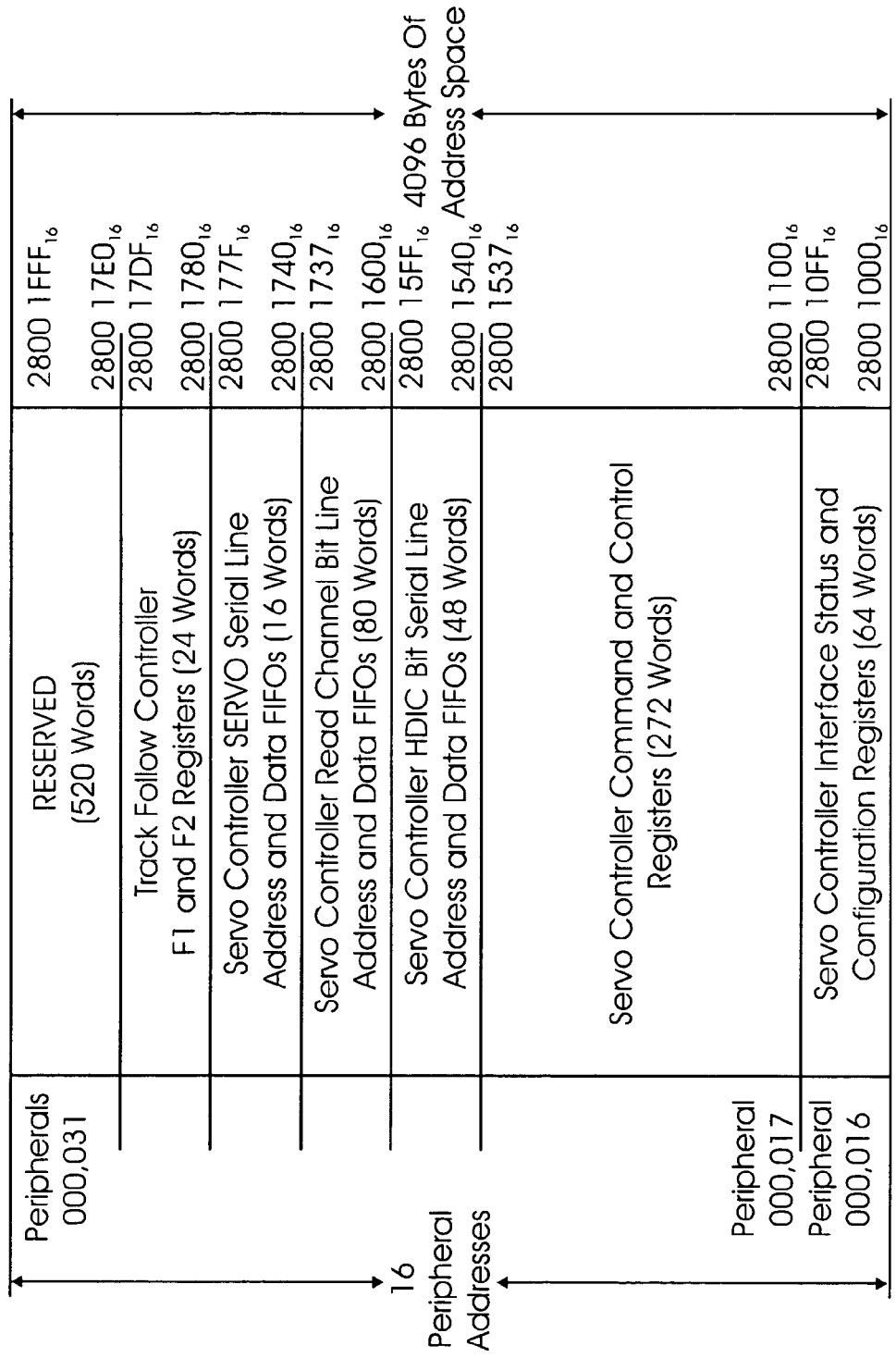
FIG. 21 shows an example of an address map for APB used in a memory-mapped register, according to one aspect of the present invention.

FIG. 21 shows an example of an address map for APB 208 used in memory mapped register 1209. SC 216 and SCI 211 are assigned 4096 bytes of register address space on the APB 208. It is noteworthy that the present invention is not limited to any particular type or size of the register map. As shown in FIG. 21, the first 64 word addresses (256 bytes) are assigned to SCI 211. The remaining 960 word addresses (3840 bytes) are assigned to SC 216. Track Follow controller (not shown) that is referenced in FIG. 21 (and FIG. 22) is a sub-module of SC 216.

Through DSPAHB Bus 233, DSP 232 can address all of the 32 bit registers (and memories) that Processor 240 can address through APB 208. Typically Processor 240 initializes SC 216 by loading three serial line program memories. The offsets for each processor are identical relative to the assigned base within the each address space.

SCI 211 resolves conflicts between the two processors. However once SC 216 is initialized typically DSP 232 controls the movement functions and the spindle motor speed control of the Disk Servo Mechanism and Processor 240 rarely accesses the Sc 216 except for system level functions.

Figure 22:
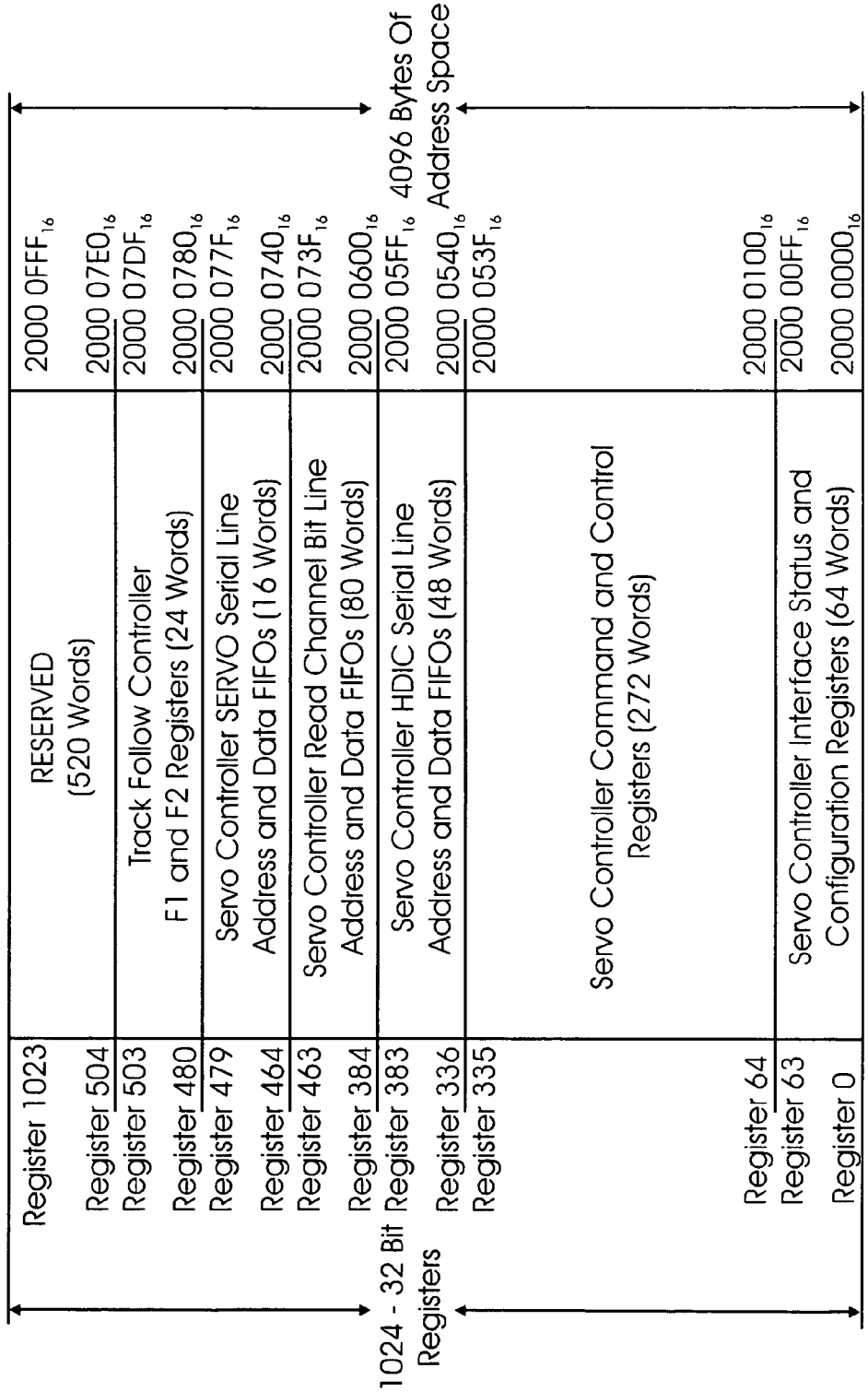
FIG. 22 shows an example of an address map for DSP used in a memory-mapped register, according to one aspect of the present invention.

In one example, SCI 211 and SC 216 are assigned 4 KB (1024 32 bit registers) (32 bits) address space in the DSPARM BUS 233 address space, as shown in FIG. 22. The first 64 register addresses (256 bytes) are assigned to SCI 211. The remaining 960 register addresses (3840 bytes) are assigned to SC 216.

APB 208 Address Exceptions

An access to a reserved or undefined memory mapped address results in SCI 211 asserting the PADREXCPT signal (described in FIG. 4B) for 1 PCLK clock cycle to APB Bridge 235. Any access to an undefined address will not change the state of SCI 211 or SC 216. An access to an undefined "read" address causes SCI 211 to assert the PADREXCPT signal and return all zeroes on PRDATA[31:00] (described in FIG. 4B) to APB Bridge 235. SCI 211 observes the following conditions for examining address exception conditions on the APB 208:

As a "word aligned" peripheral, SCI 211, examines PADDR[01:00] for zero. If these two bits are nonzero, SCI 211 treats the access like an "address exception" and asserts the PADREXCPT signal to APB Bridge 235. The contents of the memory mapped register set in SCI 211 or SC 216 is not altered when an "address exception" is detected.

If PADDR[11:08]=0 (local register access) SCI 211 examines bits PADDR[07:02] for valid addresses. Any invalid address results in the declaration of an "address exception" by SCI 211 asserting the PADREXCPT signal for one PCLK clock cycle (described in FIG. 4A) to APB Bridge 235.

If PADDR[11:08]=non-zero (external access) then SCI 211 declares a valid address for SC 216. SC 216 examines PADDR[07:02] for an invalid address (undefined or reserved addresses). If an invalid address is detected, SC 216 returns one of two signals, APBRAExcpt (described in FIG. 11)(for a read access) or APBWAExcpt (described in FIG. 11) to SCI 211 (for a write access). SCI 211 asserts the PADREXCPT signal for one PCLK clock cycle to the APB Bridge 235 and sets the SCIARMAdrExcpt bit in the SCIARMStatusReg (described in FIG. 23).

If Processor 240 attempts a write access to any register other than the SCIARMStatusReg or the SCISemaphoreReg (described in FIG. 24A), while DSP 232 owns the hardware interlock semaphore an "address exception" is declared. SCI 211 sets the SCIARMSmphCflt bit (described in FIG. 24A) in the SCIARMStatusReg and asserts the PADREXCPT signal for one PCLK clock cycle to the APB Bridge 235.

The detection of any of the conditions listed above will result in the generation of an "address exception". SCI 211 only sets the SCIARMAdrExcpt bit (described in FIG. 23) for SC 216 detected "address exception" and the SCIARMSmphCflt bit for hardware semaphore violations in the SCIARMStatusReg. If neither of these bits is set when SCI 211 reports an "address exception" (asserts PADREXCPT) then it is assumed that SCI 211 detected an "address exception" on its local register map.

DSPAHB 233 Address Exceptions

SCI 211 examines DSP_HADDR[25:00] (described in FIG. 5A) for "address exceptions" (reserved and undefined addresses) and DSP_HSIZE[1:0] (described in FIG. 5A) for invalid values. An access to a reserved or undefined memory mapped address results in SCI 211 returning a two cycle Error Response on the DSPAHB Bus 233 if the access is to a "local register". If the access is for SC 216 an "address exception" is signaled by SCI 211 asserting the DSPARM interrupt (SRVCTRLDSPINT described in FIG. 6)) signal to DSPIM 210 and sets the DSPARM Address Exception bit (SCIDSPAdrExcpt described in FIG. 6) in the SCIDSPStatusReg register. Any access to an undefined or reserved address will not alter any state (registers) in SCI 211 and SC 216.

An access to an undefined "read" address in SC 216 will cause SCI 211 to assert the SRVCTRLDSPINT signal, set the DSPARM Address Exception bit in the SCIStatusReg and return all zeroes on DSP_HRDATA[31:00] to DSP 232.

The detection of any one of the following conditions by SCI 211 and SC 216 will result in an address exception condition:

If DSP_HADDR[25:12] values are non-zero, then SCI 211 declares an "address exception" and a two cycle Error Response is returned to DSP 232. [0151] If the access is a write (DSP_HWRITE=1 (described in FIG. 5A)), then SCI 211 examines the DSP_HSIZE[1:0] (described in FIG. 5A) for a value of 10b. If DSP_HSIZE[1:0] is not equal to 10b (word access), SCI 211 declares an "address exception" and returns a two cycle Error Response to DSP 232.

For read accesses, SCI 211 ignores the value contained in the DSP_HSIZE field with the exception of a value of 11b and returns the full contents of the 32 register accessed on the DSP_HRDATA[31:00]. If the DSP_HSIZE[1:0]=11b, then SCI 211 declares an "address exception" and returns a two cycle Error Response to DSP 232. DSP 232 determines the byte, halfword or word of interest within the 32 bits of read data.

If DSP_HADDR[25:08]=0 (local register access), SCI 211 examines bits DSP_HADDR[07:00] for valid addresses. Any invalid address results in the declaration of an "address exception" and a two cycle Error Response is returned to DSP 232.

If DSP_HADDR[25:12]=0 & DSP_HADDR[11:08]=non-zero (external access), then the SCI 211 declares a valid address for SC 216. SC 216 examines DSP_HADDR[11:02] (internally SRVDSPIfAdrReg[11:00](described in FIG. 10) for reads and SRVCTRLWAdr[9:0] for writes (described in FIG. 8)) for an invalid address (undefined or reserved addresses). If an invalid address is detected, then SC 216 returns one of two signals, DSPRAExcpt (for a read access) (described in FIG. 11) or DSPWAExcpt (for a write access) (described in FIG. 11) to SCI 211. SCI 211 asserts interrupt (SRVCTRLDSPINT) signal to DSP 232 and sets the DSPARM Address Exception bit (SCIDSPAdrExcpt) in the SCIDSPStatusReg. On a read transaction SCI 211 returns zeroes on read data (DSP_HRDATA[31:00]).

If DSP 232 attempts a write access to any register other than the SCIDSPStatusReg or the SCISemaphoreReg while Processor 240 owns the hardware interlock semaphore, an "address exception" will be declared. SCI 211 will set the SCIDSPSmphCflt bit in the SCIDSPStatusReg and return a two cycle Error Response to the DSP 232.

If DSP 232 attempts to a write access to any Memory Mapped register in SCI 211 or SC 216 without the DSPARM Interface 215 being enabled (EnDSPIntfc, SCICtrlReg[00]), an address exception occurs. The only register the DSP 232 may write without the interface being enabled is the SCIDSPStatusReg.

Status Registers

FIG. 23 shows a table of values for a SCI 211 status register (SCIARMStatusReg) used for Processor 240. For APB 208 transactions, SCI 211 only observes (connects to) address bits PADDR[11:00] (described in FIG. 4A) from APB 208. SCI 211, which is a "word aligned" peripheral examines PADDR [01:00] for an "address exception" violation. The value of DSP_HADDR[01:00] (described in FIG. 5A) is ignored by SCI 211 for all accesses.

FIG. 24 shows a table of values for a SCI 211 status register (SCIDSPStatusReg) used DSP 232. When DSP 232 writes this register, only the bits that have ones in their respective bit positions of the write data (DSP_HWDATA[31:00]) (described in FIG. 5A) are cleared to zero. Any other bit that is set (=1) in this register and has a zero in its respective bit position of the write data will remain set. Also, Processor 240 may only read this register.

SCI 211 Semaphore Register

FIG. 24A shows a table with various fields/values that are used by SCI 211 semaphore register (SCISemaphoreReg) to prevent conflict between DSP 232 and Processor 240. To acquire a semaphore the processor (232 or 239) writes the semaphore bit and then reads the semaphore to determine if it acquired ownership of the semaphore. For example, IF semaphore read=1 processor (232 or 239) owns the semaphore ELSE semaphore owned by the other processor.

SCISemaphoreReg is a. "write one to clear" register. When DSP 232(via DSPAHB Bus 233) or Processor 240 (via APB 208) writes this register only the bits that have ones in their respective bit positions of the write data (PWDATA[31:00] (described in FIG. 4A) or DSP_WDATA[31:00]) (described in FIG. 5A) are cleared to zero. Any other bit that is set (=1) in this register and has a zero in its respective bit position of the write data remains set.

Any write violation by Processor 240, when DSP 232 owns the hardware interlock semaphore will result in SCI 211 asserting the PADREXCPT signal (described in FIG. 4B) to the APB Bridge 235 and setting the SCIARMSmphCflt bit in the SCIARMStatusReg, when DSP 232 owns the hardware interlock semaphore. However, Processor 240 may read any register without any violation.

Any write violation by DSP 232, when Processor 240 owns the hardware interlock semaphore will result in SCI 211 returning a two cycle Error Response to DSP 232 and setting the SCIDSPSmphCflt bit in the SCIDSPStatusReg. When Processor 240 owns the hardware interlock semaphore, DSP 232 may read any register without any violation. DSP 232 may only write SCISemaphoreReg and the SCIDSPStatus-Reg while the Processor 240 owns the hardware interlock semaphore.

One Memory Mapped address points to the SCISemaphoreReg as a logical register, even though it is actually made up of two physical registers (see FIG. 26), one for the APB 208 side and one for the DSPAHB Bus 233 side. Write conflicts between APB 208 and the DSPAHB Bus 233 are resolved on a logical register basis by holding (one bus wait state) the AHB 208 write for one clock cycle. When a simultaneous write to the logical register occurs from both the buses, then APB 232 has priority over the AHB Bus 233 and wins the semaphore.

Figure 26:
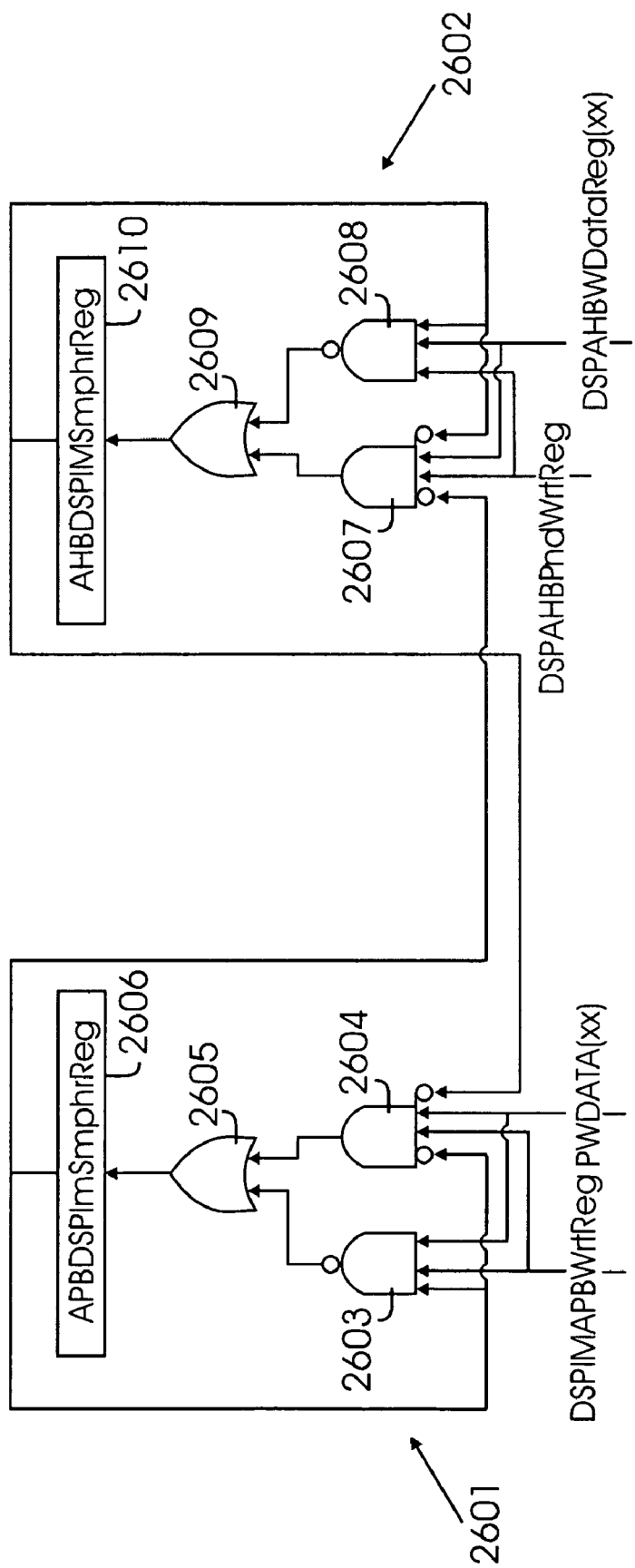
FIG. 26 shows a logic diagram for the semaphore functionality, according to one aspect of the present invention.

FIG. 26 shows a logic diagram for register SCISemaphoreReg for both the APB 208 and DSP 232 side. The table shown in FIG. 25 shows various bit values for operating SCISemaphoreReg.

Logic 2601 handles processor 240 sides, while logic 2602 handles DSP 232 side. Gates 2603 and 2604 receive signals DSPIMAPBWrTReg and PWData respectively. Gate 2605 receives inputs from 2603 and 2604 and an output is sent to register 2606. The same process works for logic 2602 with gates 2607, 2608, 2609 and register 2610 using signals DSPAHBPndWrtReg and DSPAHBWDataReg.

Other Registers

SCI 211 Control register: FIG. 27 shows a table that is used by SCI 211 control register (SCICtrlReg) for performing various functions described above.

FIGS. 28-38 describe various other registers that are used in various adaptive aspects of the present invention.

Although the present invention has been described with reference to specific embodiments, these embodiments are illustrative only and not limiting. Many other applications and embodiments of the present invention will be apparent in light of this disclosure and the following claims.

What is claimed is:

1. A servo controller interface for a disk controller, wherein the disk controller includes a servo controller, the servo controller interface comprising:
    a first interface configured to communicate with a first processor over a first bus in a first frequency domain;
    a second interface configured to communicate with a second processor over a second bus in a second frequency domain that is different than the first frequency domain;
    a speed matching first in first out (FIFO) memory module configured to
        receive first data from the first processor over the first bus via the first interface in the first frequency domain, and
        receive second data from the second processor over the second bus via the second interface in the second frequency domain; and
    a pipeline control module configured to
        select which of the first data and the second data is transmitted to the speed matching FIFO memory module in response to no conflicts existing between the first processor and the second processor, and
        selectively insert wait cycles during transmission of one of the first data and the second data in response to a conflict existing between the first processor and the second processor.

2. The servo controller interface of claim 1, wherein the servo controller interface operates in the first frequency domain, and the servo controller operates in one of the first frequency domain and a third frequency domain.

3. The servo controller interface of claim 1, wherein the first processor and the second processor share memory mapped registers within the servo controller.

4. The servo controller interface of claim 1, wherein the pipeline control module determines a number of the wait cycles to insert based on the first frequency domain.

5. The servo controller interface of claim 1, wherein the pipeline control module selectively inserts the wait cycles based on whether the transmission corresponds to a read access or a write access.

6. The servo controller interface of claim 1, wherein the pipeline control module inserts the wait cycles during a read access in response to a conflict existing between the first processor and the second processor.

7. The servo controller interface of claim 1, wherein the pipeline control module de-asserts a ready signal during a write access in response to a conflict existing between the first processor and the second processor.

8. The servo controller interface of claim 1, wherein:
    in response to a conflict existing between the first processor and the second processor, the pipeline control module (i) inserts the wait cycles for the first data and (ii) does not insert the wait cycles for the second data; and
    the first frequency domain has a higher frequency than the second frequency domain.

9. A method of operating a servo controller interface for a disk controller, wherein the disk controller includes a servo controller, the method comprising:
    communicating with a first processor over a first bus in a first frequency domain using a first interface;
    communicating with a second processor over a second bus in a second frequency domain that is different than the first frequency domain using a second interface;
    receiving first data at a speed matching first in first out (FIFO) memory module from the first processor over the first bus via the first interface in the first frequency domain;
    receiving second data at the speed matching FIFO memory module from the second processor over the second bus via the second interface in the second frequency domain;
    selecting which of the first data and the second data is transmitted to the speed matching FIFO memory module in response to no conflicts existing between the first processor and the second processor; and
    selectively inserting wait cycles during transmission of one of the first data and the second data in response to a conflict existing between the first processor and the second processor.

10. The method of claim 9, wherein the servo controller interface operates in the first frequency domain, and the servo controller operates in one of the first frequency domain and a third frequency domain.

11. The method of claim 9, wherein the first processor and the second processor share memory mapped registers within the servo controller.

12. The method of claim 9, further comprising determining a number of the wait cycles to insert based on the first frequency domain.

13. The method of claim 9, further comprising selectively inserting the wait cycles based on whether the transmission corresponds to a read access or a write access.

14. The method of claim 9, further comprising inserting the wait cycles during a read access in response to a conflict existing between the first processor and the second processor.

15. The method of claim 9, further comprising de-asserting a ready signal during a write access in response to a conflict existing between the first processor and the second processor.

16. The method of claim 9, further comprising, in response to (i) a conflict existing between the first processor and the second processor and (ii) the first frequency domain having a greater frequency than the second frequency domain:
   inserting the wait cycles for the first data; and
   not inserting the wait cycles for the second data.

* * * * *